(12) United States Patent
Yoshidome

(10) Patent No.: US 10,757,289 B1
(45) Date of Patent: Aug. 25, 2020

(54) SCANNING SYSTEM AND METHOD WITH FILE FOLDER APPARATUS

(71) Applicant: Kyocera Document Solutions Inc., Osaka (JP)

(72) Inventor: Gin Yoshidome, San Ramon, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/455,435

(22) Filed: Jun. 27, 2019

(51) Int. Cl.
*H04N 1/10* (2006.01)
*H04N 1/00* (2006.01)

(52) U.S. Cl.
CPC ....... *H04N 1/1026* (2013.01); *H04N 1/00018* (2013.01); *H04N 1/00599* (2013.01); *H04N 1/1017* (2013.01); *H04N 2201/0434* (2013.01)

(58) Field of Classification Search
CPC .......... B65H 2511/20; B65H 2511/415; B65H 2220/01; B65H 2220/02; B65H 2301/43827; B65H 2301/5113; B65H 2301/51532; B65H 2801/27; B65H 39/02; B65H 39/10; B26D 1/065; B26D 7/015; G03G 15/6541; G03G 15/6544; G03G 2215/00814; G03G 2215/00822; G03G 2215/0177; G06F 3/1206; G06F 3/1271; G06F 3/1205; G06F 3/1207; G06F 3/1222; G06F 3/1238; G06F 3/126; G06F 3/1267; G06F 3/1285; H04N 2201/0094; H04N 1/00244; H04N 1/00307; H04N 1/00408; H04N 1/00954; H04N 1/2179; H04N 1/4433

USPC ......................................... 358/497, 496, 498
See application file for complete search history.

(56) References Cited

U.S. PATENT DOCUMENTS

| | | | |
|---|---|---|---|
| 4,942,482 A | 7/1990 | Kakinuma et al. | |
| 5,612,791 A | 3/1997 | Turner et al. | |
| 5,640,252 A | 6/1997 | Turner et al. | |
| 5,798,841 A | 8/1998 | Takahashi | |
| 9,695,006 B1 * | 7/2017 | Yoshidome | B26D 1/065 |
| 10,158,778 B1 * | 12/2018 | Yoshidome | H04N 1/00954 |
| 10,225,429 B1 * | 3/2019 | Manabe | H04N 1/2179 |
| 10,547,758 B1 * | 1/2020 | Yoshidome | G03F 7/70858 |

* cited by examiner

*Primary Examiner* — Negussie Worku
(74) *Attorney, Agent, or Firm* — James Judge

(57) ABSTRACT

A device, e.g., multi-functional scanner (MFS), for handling a paper holder (folder) having an upper cover and a lower cover, the MFS including a control circuit, a platform configured to receive the paper holder, and a lifting mechanism comprising an adhesive member. The adhesive member is configured to removably attach to the upper cover of the paper holder. The lifting mechanism is configured to flip the upper cover of the paper holder open when the adhesive member is attached to the upper cover. The lifting mechanism is configured to detach from the paper holder and return to its original position away from the paper holder after the upper cover is flipped open. Also provided are methods of automatically opening a paper holder and processing (e.g., scanning, printing) the documents contained inside.

20 Claims, 29 Drawing Sheets

SCANNING SYSTEM AND METHOD WITH FILE FOLDER APPARATUS

FIELD OF THE INVENTION

The present disclosure relates to a scanning system with a lifting mechanism adapted to be employed in a scanner, an image forming apparatus, an optical reader system, a copying machine, or a multi-functional scanner ("MFS"), multi-functional printer, all-in-one ("AIO") printer, or the like, for automatically opening a folder and removing contents from the folder for processing (scanning, copying, printing).

BACKGROUND

An electrophotographic image forming apparatus using an intermediate transfer method in order to print a scanned image from a document is widely known. When documents need to be scanned from inside a physical folder or binder, the documents first need to be manually removed from the folder or binder and then placed onto the transfer or processing unit of the apparatus. This is a timely, tedious, insecure, and error prone process, particularly when involving large volumes of documents and/or sensitive documents.

The present disclosure has been made in light of the above problems associated with the manual process. The present disclosure, for example, automates the process so that a document can be printed or scanned without having to manually remove the document from the folder or binder.

SUMMARY

According to one aspect of the disclosure, a device, e.g., scanner configured for handling a paper holder (e.g., a folder) comprising an upper cover and a lower cover, includes: a control circuit; a platform configured to receive the paper holder; and a lifting mechanism comprising an adhesive member. The lifting mechanism is configured to move in X, Y, and Z directions in response to an instruction from the control circuit. The adhesive member is configured to removably attach to the upper cover of the paper holder, The lifting mechanism is configured to flip the upper cover of the paper holder open when the adhesive member is attached to the upper cover. The lifting mechanism is configured to detach from the paper holder and return to its original position (first position) away from the paper holder after the upper cover is flipped open.

BRIEF DESCRIPTION OF THE DRAWINGS

The following drawings illustrate examples of various components of embodiments of the disclosure disclosed herein and are for illustrative purposes only.

FIG. 5A shows the arm 32 moving towards the folder 100 (i.e., between position 1 and position 2). FIG. 5B shows an arm 32 attached to (i.e., stuck to via belt 36) a central portion of the front side 110a of the upper cover 110 of the folder 100 (i.e., position 2). FIG. 5C shows the arm 32 in a rotated position above the central portion of the front side 110a of the folder cover 110 (e.g., position 3). FIG. 5D shows the arm 32 after rotating in a semi-circular manner and opening the folder 100 to expose the documents 150 (e.g., position 4). FIG. 5E shows the lifting mechanism 30 in release mode (position 5). FIG. 5F shows the folder 100 in an open position (e.g., folder sides 110b and 120a facing upward) and the lifting mechanism 30 positioned away from the folder cover (e.g., position 6).

FIG. 6A shows a first step of the process. FIG. 6B shows a second step of the process. FIG. 6C shows a third step of the process. FIG. 6D shows a fourth step of the process. FIG. 6E shows a fifth step of the process.

DETAILED DESCRIPTION

Figure 1:
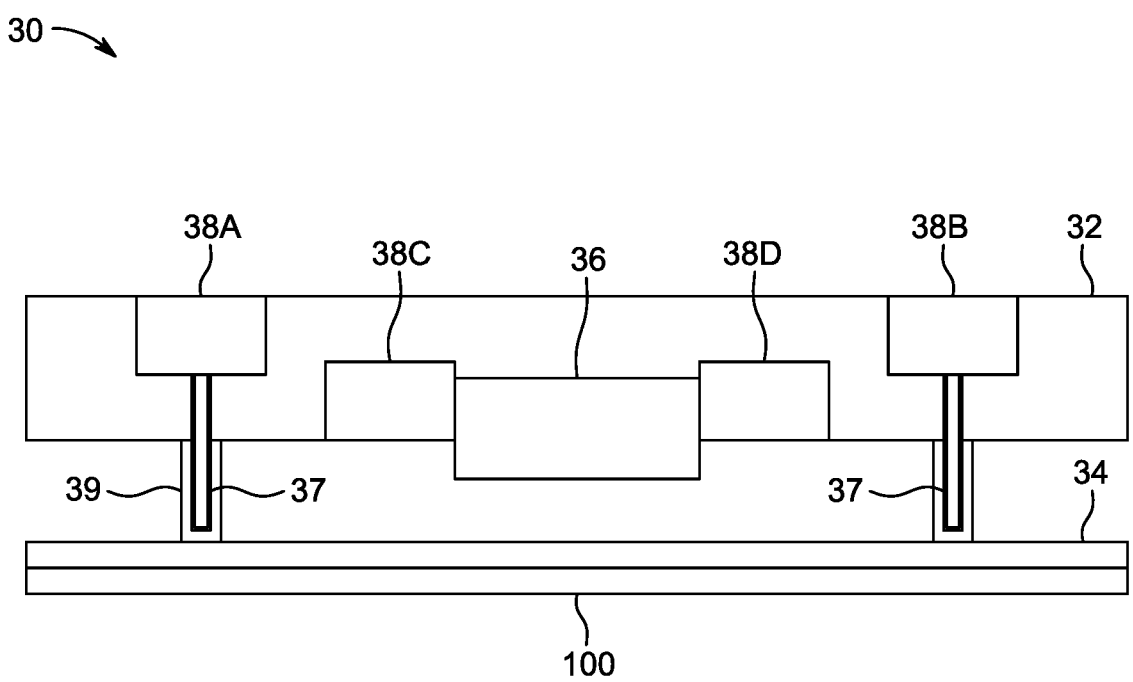
FIG. 1 illustrates a cutaway side view of a first embodiment of a lifting mechanism 30 in mode B (release mode).

The inventor has created a method and apparatus for automatically copying, printing, or scanning documents inside a paper holder (e.g., folder, binder, etc.) without having to manually remove the documents from inside the paper holder.

In one example, illustrated in FIGS. 1-6, a paper holder 100 (e.g., folder) of papers 150 (documents) is placed on a conveyor 200 (e.g., transferring device) or receiving surface 220 of a multi-functional scanner ("MFS") 1. In this example, the scanner 1 is configured to detect that the object on the receiving surface 220 is a folder 100 (not just a stack of papers 150 or a binder 400). This detection can be accomplished by a simple user command (e.g., on a control panel or remote communication device) or by taking an image of the object and comparing the image with an image of a folder using a neural network, artificial intelligence (AI), or the like. The conveyor 200 or receiving surface 220 may be a modular component integrated with the scanner 1. A lifting mechanism 30 comprising an arm 32, plate 34, and adhesive head 36 (belt) is configured to move to a position above a central upper portion of the folder cover. The mechanical operation of the lifting mechanism 30 (and other components of the scanner 1) is controlled by a control circuit 1500 containing a microprocessor and memory. The arm 32 is configured to move to a position in order to adhere the belt 36 to an upper cover 110 of the folder 100. The arm is also configured to rotate, preferably in a half circle pattern, to lift (open) the upper cover 110. The plate 34 is configured to engage the upper cover 110 prior to the arm 32 retracting from its adherence position, in order to release the belt 36 from the open upper cover 110. The lifting mechanism 30 is configured to return to its original position when it is determined that the folder 100 is sufficiently open.

A paper pusher 50 controlled by the control circuit 1500 (or another control circuit) is configured to push the documents onto a platform 300 of the scanner 1 for processing (e.g., scanning, copying, printing, etc.). The folder 100 will then be moved to a location for replacing the processed documents. The details of several embodiments of the disclosure will be described below.

The figures are not necessarily shown to scale and some features may be shown larger or smaller than they are with respect to other features in order to facilitate their explanation.

FIG. 1 illustrates a cutaway side view of lifting mechanism 30 in a release mode (mode B). In this embodiment, the lifting mechanism 30 includes an arm 32, a plate 34, an adhesive belt 36, a plurality of motors 38A-D (e.g., servo-motors), and shafts 39*a-b* connecting the arm 32 to the plate 34. The motor 38 may be a rotary actuator or linear actuator that allows for precise control of angular or linear position, velocity and acceleration. It consists of a suitable motor coupled to a sensor for position feedback (not shown). An opening 34*a* (shown in FIG. 2A) is formed through the plate 34 and is configured to allow a lower portion of the belt 36 to extend through the opening 34*a* in mode A (adhesive mode) to contact a front side 110*a* of the upper cover 110 of a folder 100. The arm 32 is configured to retract from the plate 34 in mode B (release mode) via operation of at least one of the motors 38*a-d*. In this embodiment, the motor 38 drives a shaft 35 (e.g., corkscrew shaft) to separate the adhesive belt 36 from the upper cover 110 of the folder 100 (described below) while maintaining force against the front side 110*a* of the upper cover 110 of the folder 100 via the plate 34. Otherwise, when in mode B (release mode) the belt 36 would remain adhered to the upper cover 110 of the folder 100 and lift the folder 100.

Figure 2A:
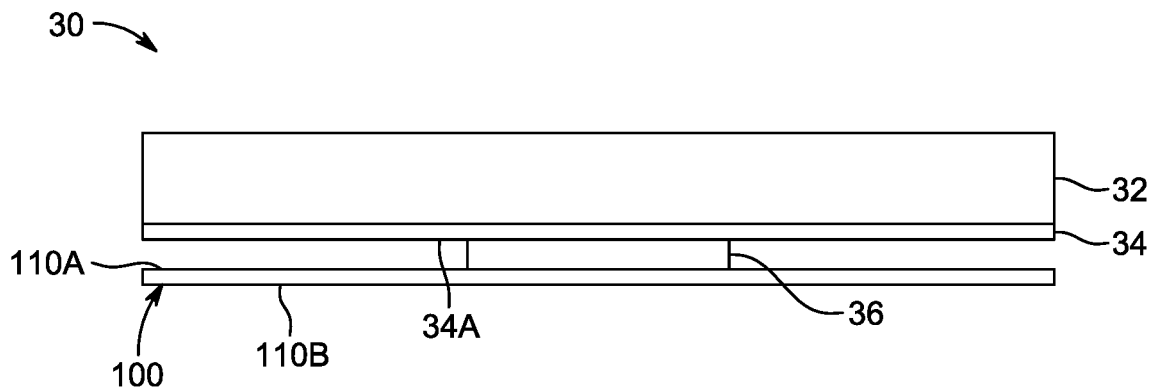
FIG. 2A illustrates a side view of the first embodiment of the lifting mechanism 30 in mode A (adhesive mode).
Figure 2B:
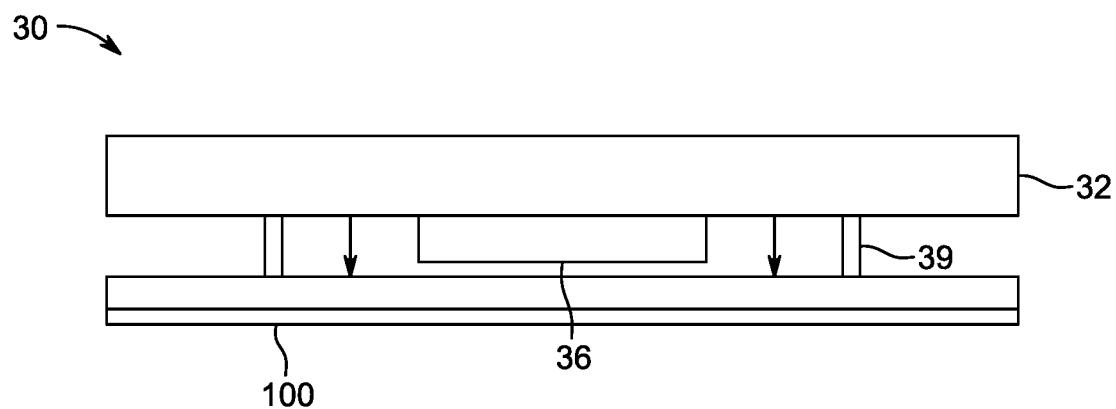
FIG. 2B illustrates a side view of the first embodiment of the lifting mechanism 30 in mode B (release mode)

FIGS. 2A and 2B illustrate a side view of the lifting mechanism 30 in mode A (adhesive mode) and mode B (release mode), respectively. As described below, the lifting mechanism 30 enters mode B after the folder 100 is in an open position (folder sides 110*b* and 120*a* facing upward), e.g., after the arm 32 has rotated in a half circle pattern to flip the folder cover 110 open).

As shown in FIG. 2A, in mode A, the belt 36 is configured to extend through an opening formed in the plate 34 to contact the folder 100. The plate 34 does not contact the folder 100 in mode A. Instead, the plate 34 is positioned adjacent or directly against an opposing surface of the arm 32.

As shown in FIG. 2B, in mode B, the plate 34 contacts the folder 100. The plate 34 is driven away from the arm 32 (and the belt 36) and towards the folder 100 by operation of a retractable (extendable) shaft 39 driven by at least one of the motors 38*a-d*. The retractable shaft 39 extends from inside the arm 32 to the plate 34. In mode B, the shaft 39 is extended, which prevents the belt 36 from extending entirely through the plate 34 and adhering to the upper cover 110; more preferably the belt 36 does not extend to a surface of the plate 34, and most preferably the belt 36 and the plate 34 are separated by a predetermined distance.

Figure 3:
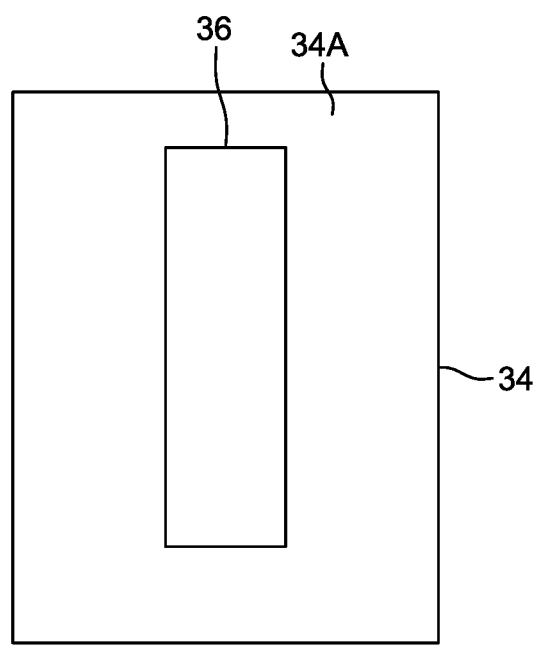
FIG. 3 illustrates a bottom view of the first embodiment of the lifting mechanism 30.

FIG. 3 illustrates a bottom view of the lifting mechanism 30. As shown, an opening 34*a* is formed in the plate 34 and the belt 36 is viewable through the opening 34*a* in mode B and extends through the opening in mode A. The plate 34 and belt 36 are rectangles in this embodiment, but it is known that they can be formed in other geometric shapes. The belt 36 comprises a sticky residue to adhere to a surface of the folder 100, binder 400, or document, with sufficient bond to flip the cover 110 over—e.g., sticky note adhesive-type.

Figure 4A:
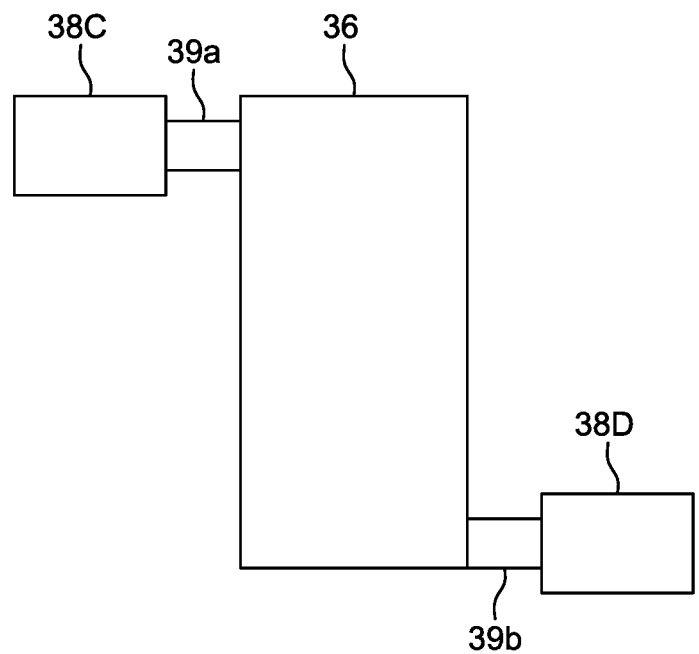
FIG. 4A illustrates a top view of the first embodiment of the belt 36.
Figure 4B:
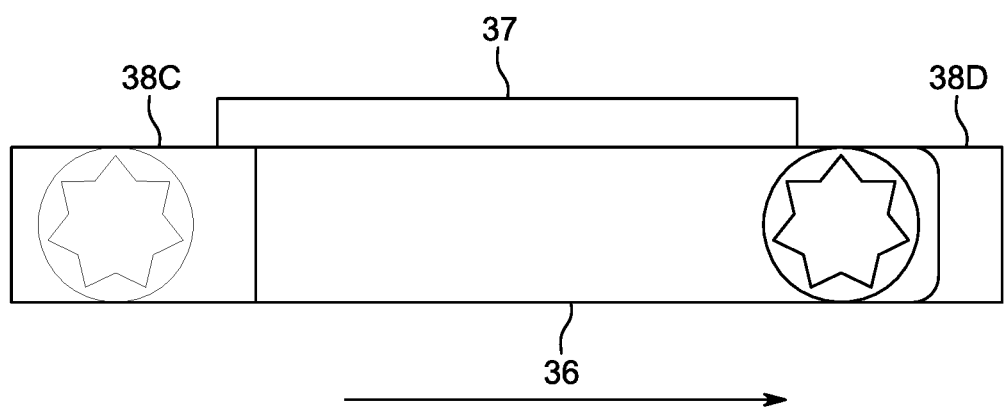
FIG. 4B illustrates a side view of the first embodiment of the belt 36.

FIGS. 4A and 4B illustrate a top view and side view, respectively, of the belt 36.

As shown in FIG. 4A, the belt 36 is driven by a plurality of motors, 38C, 38D. In this embodiment, each of the motors 38*c* and 38*d* engages a drive shaft 39*a* and 39*b* arranged on opposite ends and sides of the belt 36.

As shown in FIG. 4B, an adhesive reservoir 37 (e.g., reglue/restick pad) may be arranged in communication with the belt 36. The belt 36 is positioned to contact the content of the reservoir 37 to transfer a portion of the content to the belt 36. This helps maintain the necessary adhesive properties of the belt 36, minimize the occurrence of a dry belt (e.g., running out of adhesive), and overcome the problems with paper fibers building up on the belt 36 and gradually reducing the tackiness of the lifting mechanism 30. In this embodiment, the reservoir 37 is arranged adjacent to an upper surface of the belt 36, but it is known that the reservoir 37 can be arranged in any suitable location that applies renewal adhesive material to the belt 36 and does not interfere with other components in the scanner 1 or lifting mechanism 30.

Figure 5A:
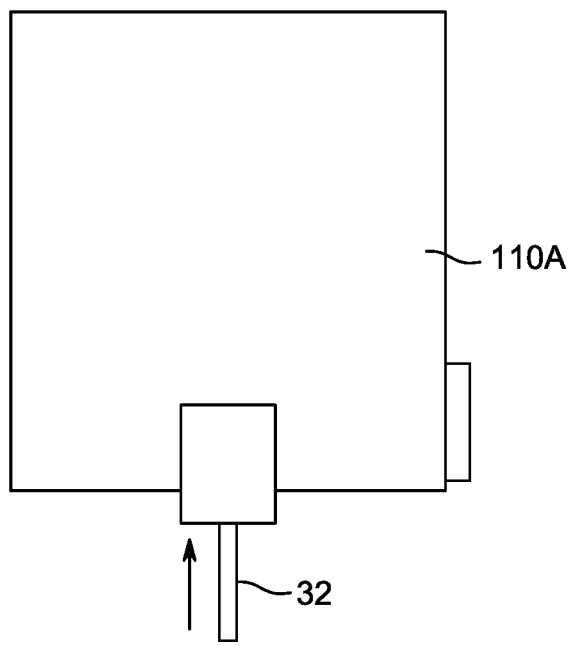
FIGS. 5A-5F illustrate a plan view of a process of opening a folder 100 using the lifting mechanism 30 described in FIGS. 1-4. As illustrated, the folder 100 comprises an upper cover 110 and a lower cover 120. The upper cover 110 includes a front side 110a and a back side 110b. The lower cover 120 includes a front side 120a and a back side 120b.
Figure 5B:
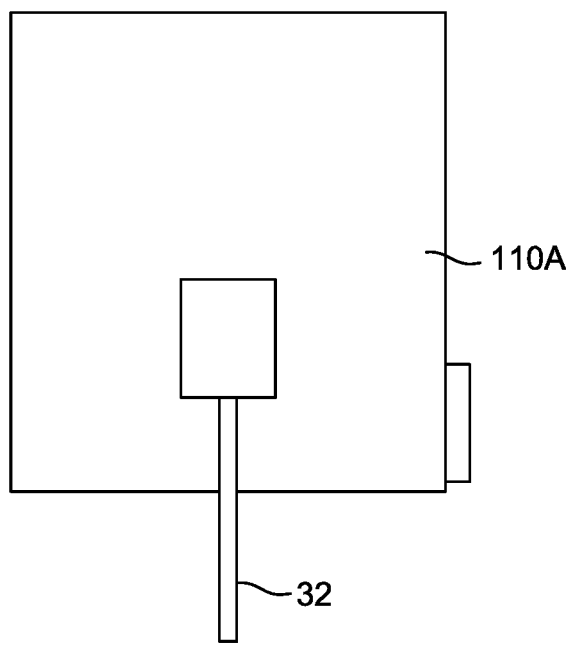
Figure 5C:
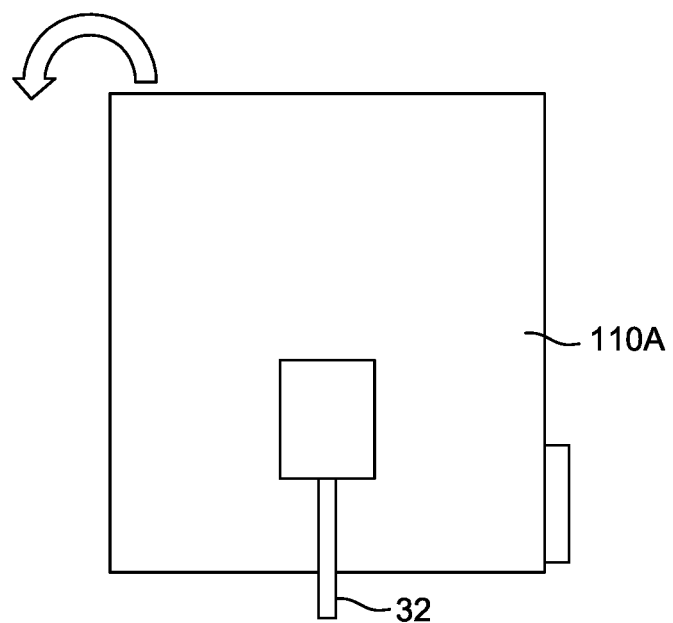
Figure 5D:
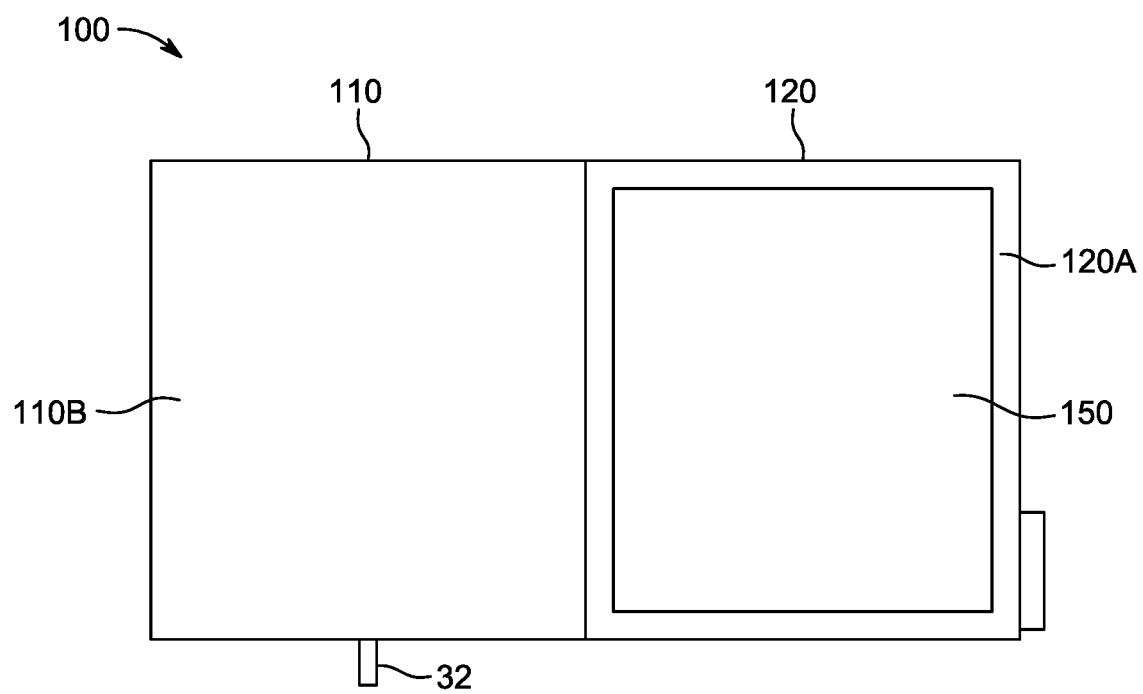
Figure 5E:
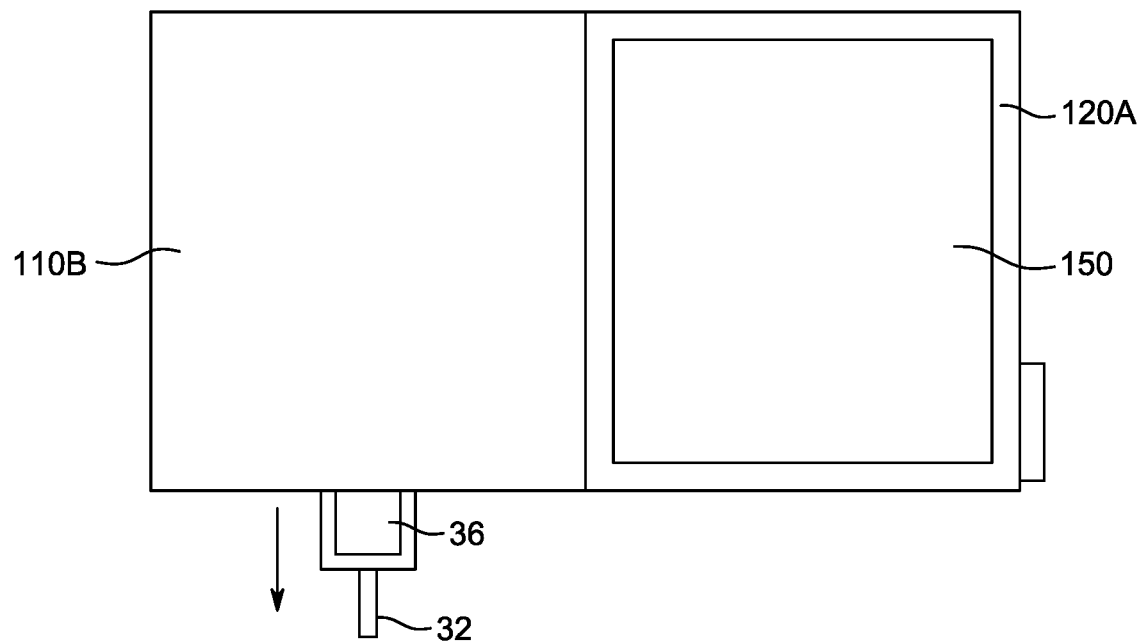
Figure 5F:
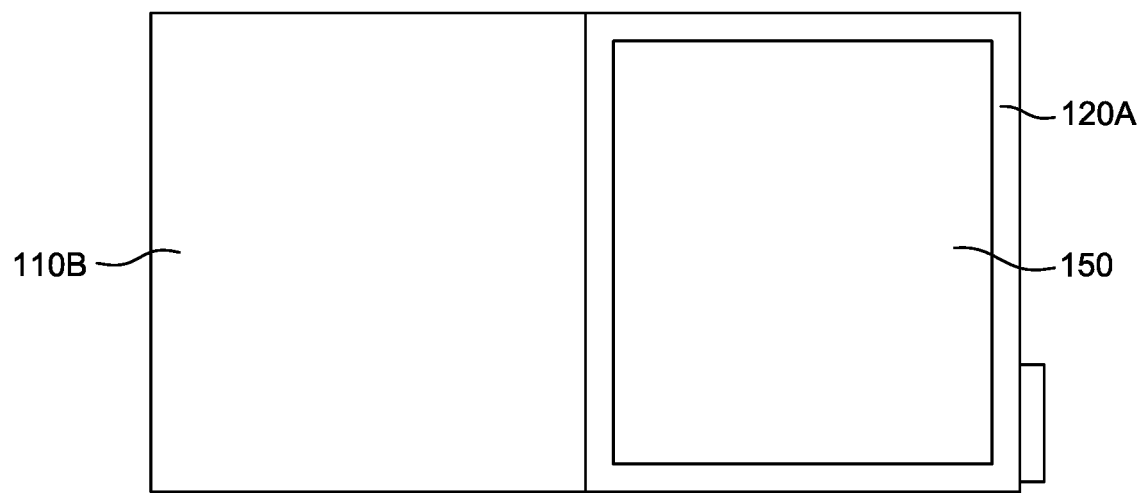

FIGS. 5A-5F illustrate a plan view of a process of opening a folder cover using the lifting mechanism 30 described in FIGS. 1-4, wherein FIG. 5A shows the arm 32 moving towards the folder 100, then FIG. 5B shows the arm 32 attached to a central portion of the upper cover 110 of the folder 100, then FIG. 5C shows the arm 32 in a rotatable position above the central portion of the upper cover 110 of the folder 100, then FIG. 5D shows the arm 32 after rotating in a semi-circular manner and opening the folder 100 to expose the documents 150, then FIG. 5E shows the lifting mechanism 30 in mode B (release mode), and then FIG. 5F shows the open folder 100 and lifting mechanism 30 completely removed from the folder 100.

The mechanical operation of the lifting mechanism 30 is controlled by a control circuit 1500 containing a microprocessor and memory (described below). The lifting mechanism 30 is programmed to move in the X, Y, and Z directions. The lifting mechanism, in the first position, moves to a central position of the upper cover 110 of the folder 100 when it is detected that a folder 100 is placed on a receiving surface 220 of the scanner 1. The lifting mechanism 30 then lowers and the belt 36 removably adheres to a front side 110a of the upper cover 110. The arm 32 of the lifting mechanism 30 then rotates in a semi-circular manner in order to open the folder 100 and expose the documents 150 (e.g., stack of papers) contained therein.

The scanner 1 may include a sensor (e.g., piezoelectric, light, etc.) on the receiving surface 220 to determine that the folder 100 is sufficiently opened before releasing the belt 36 from the front surface 110a of the upper cover 110. The scanner 1 may determine the folder 100 is sufficiently opened based on a rotational angle of the arm 32 of the lifting mechanism 30. After the folder 100 is sufficiently opened, the lifting mechanism 30, in mode B, is configured to release the belt 36 from the upper cover 110. The lifting mechanism 30 then retreats away from the folder 100.

FIGS. 6A-E illustrate a process of pushing the exposed documents 150 inside the folder onto the receiving surface 220 of the scanner 1 for processing (scanning, copying, printing, etc.). After the documents are pushed onto the receiving surface 220, the folder is moved to a different location (not shown) for replacing the processed documents.

The scanner 1 includes a paper pusher 50 configured to move in the lateral direction, and a first roller 370a and second roller 370b configured to move in the X, Y, and Z directions. The rollers 370a and 370b may be formed of elastically deformable material. The paper pusher 50 and the rollers 370a and 370b are driven by servomotors 38 operated by a control circuit 1500 containing a microprocessor and memory, which may be the same control circuit 1500 operating the lifting mechanism 30.

Figure 6A:
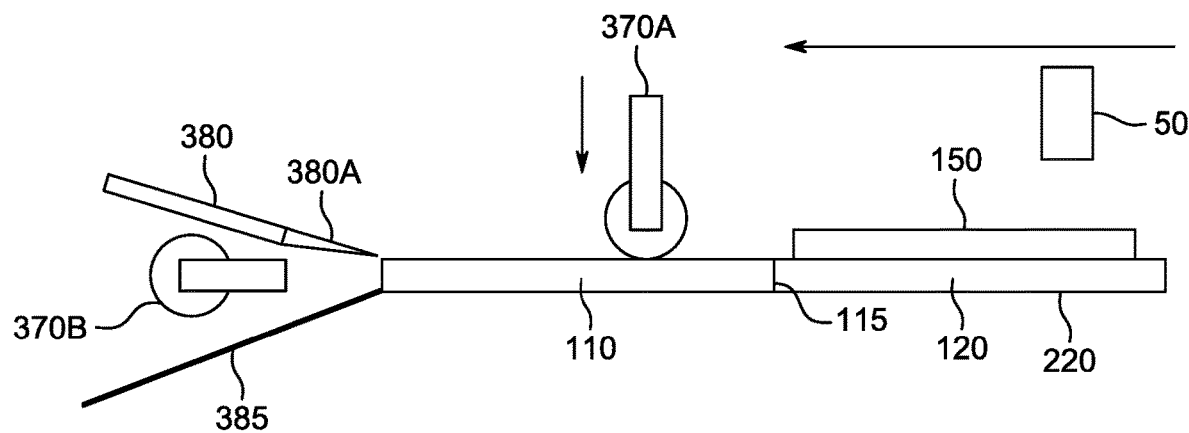
FIGS. 6A-E illustrate a process of pushing the documents 150 stacked on top of folder side 120a onto a platform 220 of the scanner 1 for processing (scanning, copying, printing, etc.).

As shown in FIG. 6A, during this step, the folder 100 having been opened by the lifting mechanism 30 is arranged on the receiving surface 220 of the scanner 1 in an open and generally horizontal position (e.g., upper cover 110 and lower cover 120 on same plane, with the upper cover 110 positioned forward from the lower cover on the receiving surface 220) and the documents 150 are stacked on the front side 120a of the lower cover 110. The paper pusher 50 is arranged above the exposed documents 150. The first roller 370a lowers to contact the front side 110a of the upper cover 110. The first roller 370a is configured to drive the folder 100 and documents 150 towards a scanner entrance 380. A second roller 370b is arranged forward from the upper cover 110 and is configured to drive the folder 100 (without documents 150) to a separate channel 385.

Figure 6B:
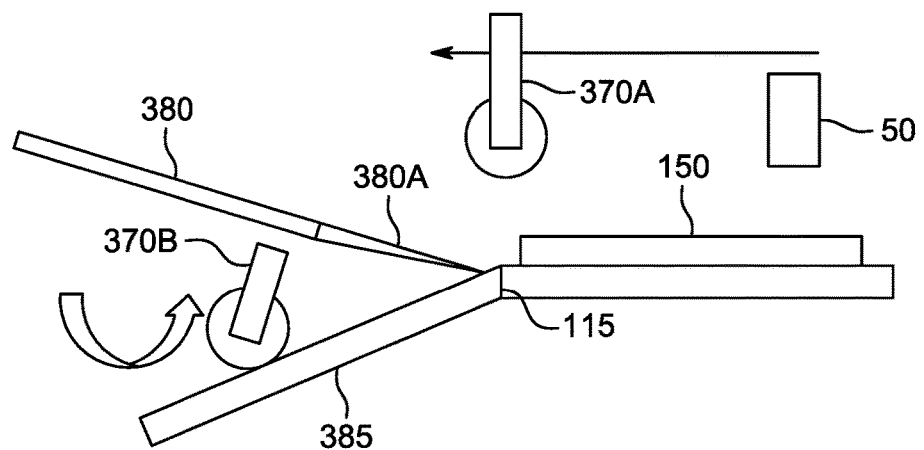

As shown in FIG. 6B, the first roller 370a then returns to its original position after driving the folder 100 forward a predetermined distance, e.g., connecting portion 115 of folder 100 positioned beneath the first roller 370 and adjacent a lip portion 380a of the scanner entrance 380. The second roller 370b swings and lowers to contact the front side 110a of the upper cover 110, thereby bending the upper cover 110 back from the lower cover 120 so that the upper cover 110 contacts a surface of the channel 385 (e.g., channel 385 extends away from the scanner entrance 380 in this embodiment).

Figure 6C:
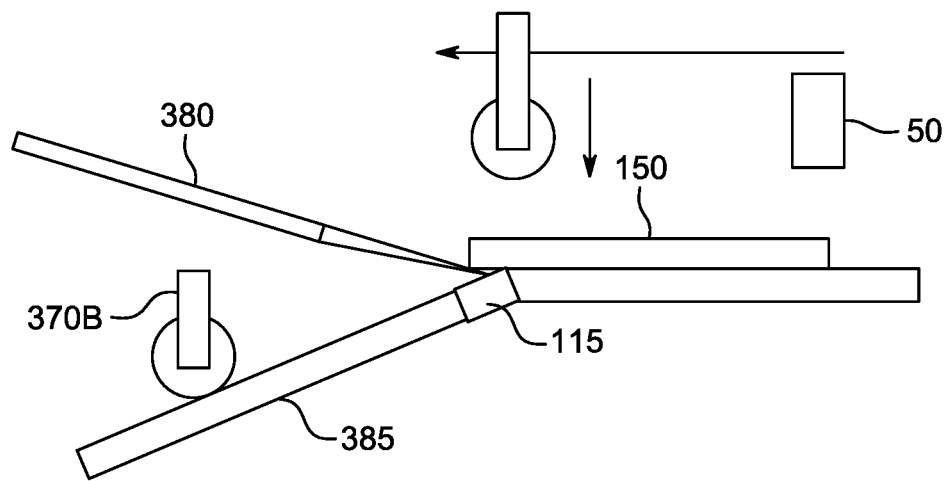

As shown in FIG. 6C, the first roller 370a then lowers to contact the top of the exposed documents 150 and the second roller 370b is in contact with the front side 110a of the upper cover 110.

Figure 6D:
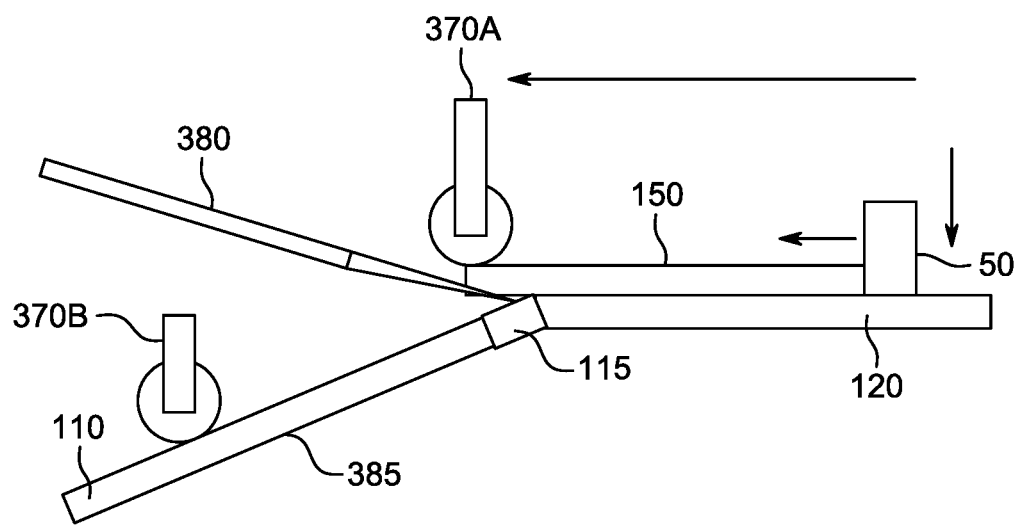

As shown in FIG. 6D, the second roller 370b drives the folder 100 forward a predetermined distance. The paper pusher 50 is then lowered to the lower cover 120 to a position adjacent the right side of the documents 150 (i.e., side opposite the lip portion 380a). The paper pusher 50 is configured to be taller than the stack of papers 150 being pushed. The paper pusher 50 moves in a lateral direction at a speed sufficient to push the stack of papers 150 to the first roller 370a.

Figure 6E:
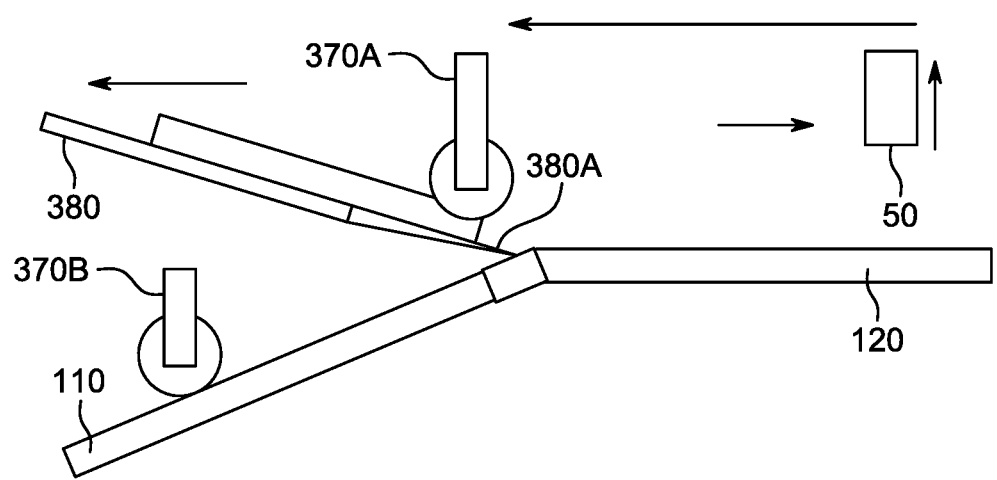

As shown in FIG. 6E, the paper pusher 50 then returns to its original position (up and to the right from position shown in FIG. 6D). The stack of papers 150 is pushed by the first roller to the scanner entrance 380 of the scanner 1 for subsequent processing (e.g., scanning, copying, printing, etc.). The folder 100 is moved to a different location (not shown) via the channel 385 for replacing the processed documents 150.

Figure 7:
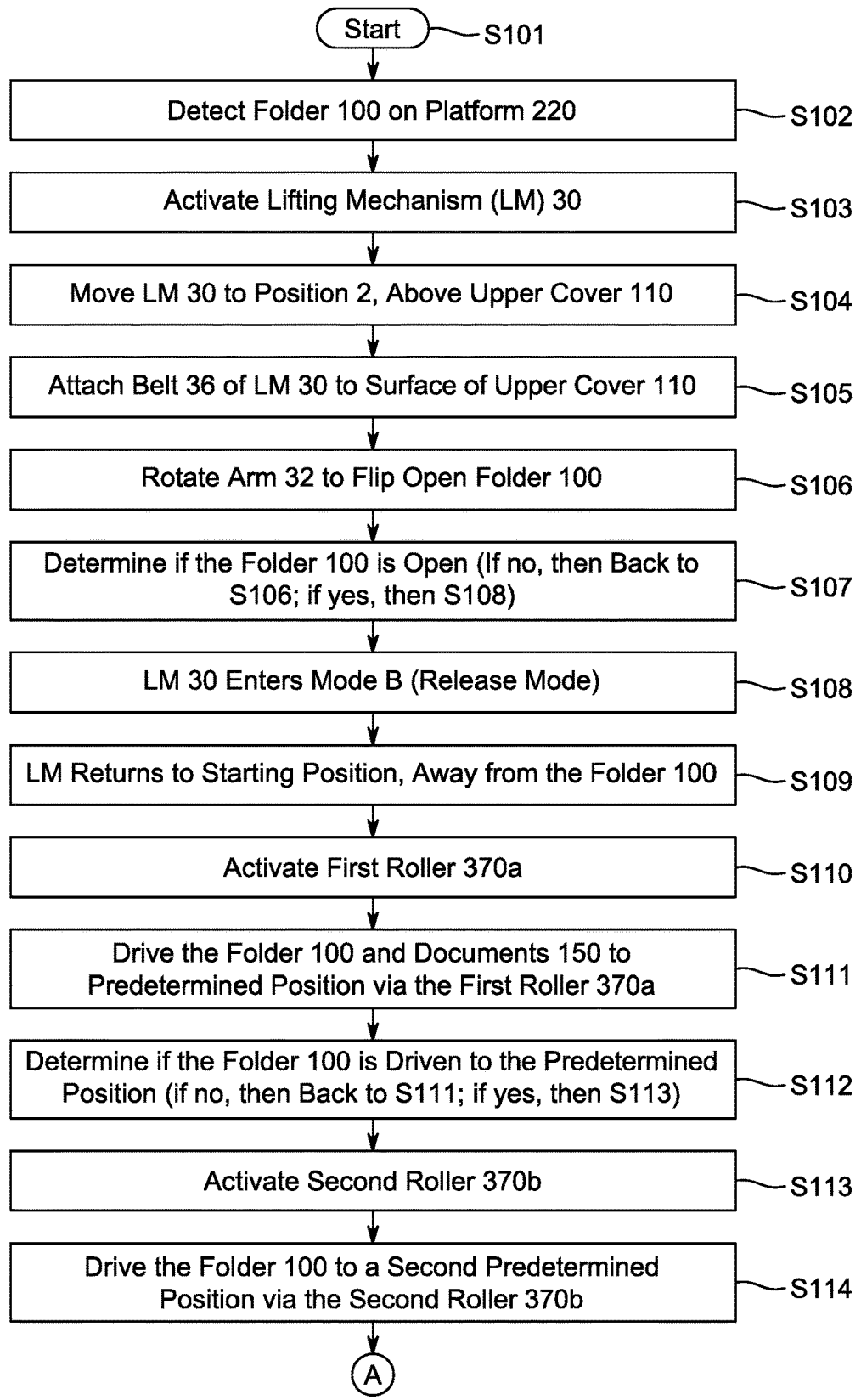
FIG. 7 is a flowchart illustrating one embodiment of a control process for opening a folder 100 using the lifting mechanism 30 described in FIGS. 1-4 and pushing the documents 150 stacked inside the folder 100 onto a platform of the scanner 1 for processing (scanning, copying, printing, etc.).
Figure 7:
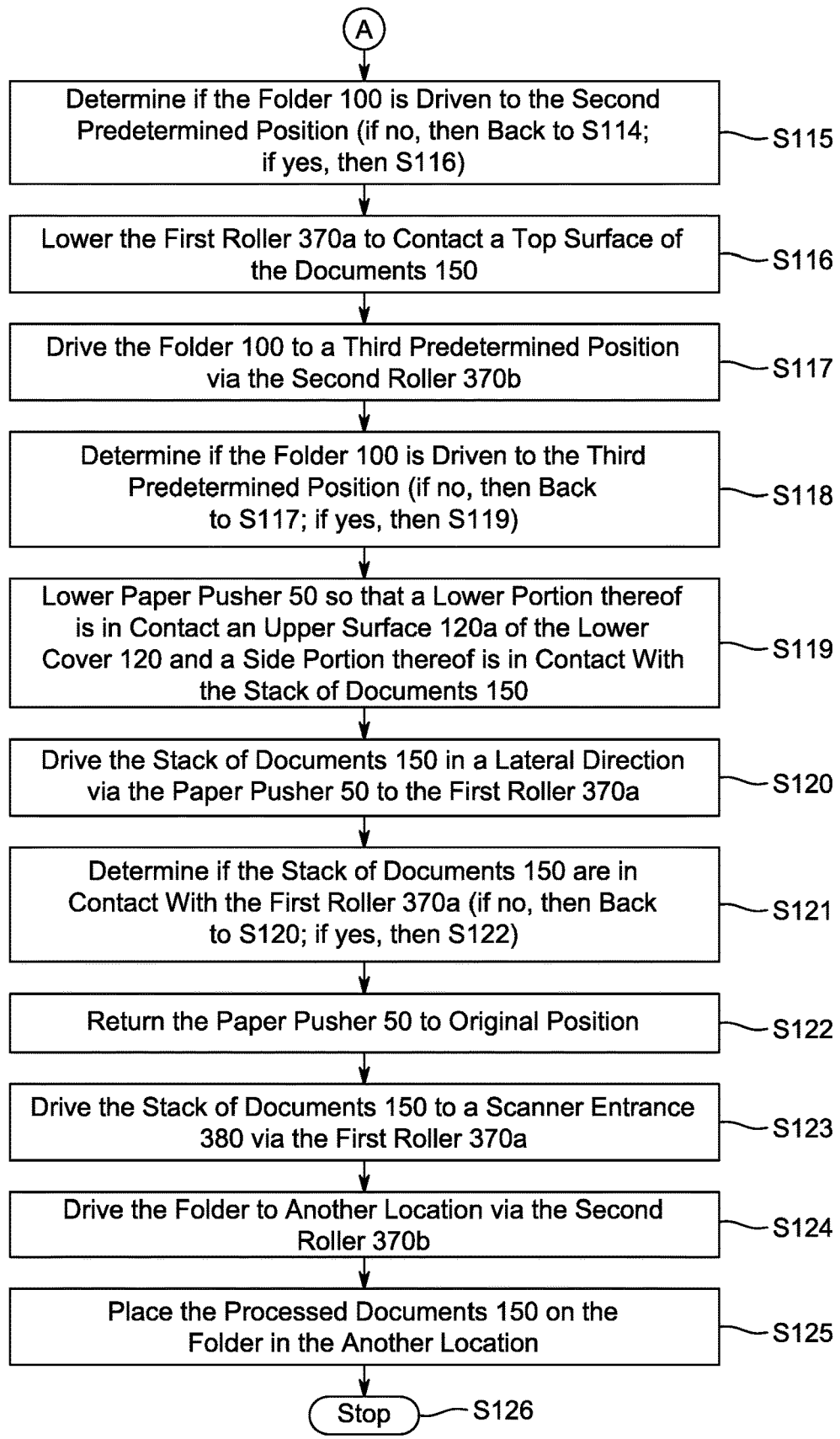

FIG. 7 is a flowchart illustrating one embodiment of a control process for opening a folder 100 using the lifting mechanism 30 described in FIGS. 1-4 and pushing the documents 150 stacked inside the folder 100 onto the receiving surface 220 of the scanner 1 for processing (scanning, copying, printing, etc.).

In the on position (S101), the scanner 1, configured with a control circuit 1500, detects a folder 100 on platform 220 (receiving surface) (S102). The control circuit 1500 sends a signal to the servomotors 38a, 38b to activate the lifting mechanism 30 (S103). The lifting mechanism 30 moves from position 1 (original position) to position 2 (described above), which is above upper cover 110 (S104). The belt 36 of the lifting mechanism 30 then attaches (sticks) to a surface of the upper cover 110 (S105). The lifting mechanism 30 then rotates arm 32 to flip open the folder 100 (S106). The control circuit 1500 determines whether the folder 100 is in an open position (S107). If no, then the control process repeats S106. If yes, then the lifting mechanism 30 enters mode B, release mode (described above) (S108). Next, the lifting mechanism 30 returns to its starting position, away from the folder 100 (S109). After the folder is opened and the lifting mechanism 30 is out of the way, the control circuit 1500 activates first roller 370a (S110), which then drives the folder 100 and documents 150 to a first predetermined position (S111). The control circuit 1500 determines whether the folder 100 is at the first predetermined position (S112). If no, then the control process repeats S111. If yes, then the control circuit 1500 activates second roller 370b (S113), which then drives the folder 100 to a second predetermined position (S114). The control circuit 1500 determines whether the folder 100 is at the second predetermined position (S115). If no, then the control process repeats S114. If yes, then the control circuit 1500 instructs a servomotor to lower the first roller 370a to contact a top surface of the stack of documents 150 (S116). Next, the second roller 370b drives the folder to a third predetermined position (S117). The control circuit 1500 determines whether the folder 100 is at the third predetermined position (S118). If no, then the control process repeats S117. If yes, then paper pusher 50 is moved to a position wherein its lower portion is in contact with a surface of the lower cover and its side portion is in contact with the stack of documents 150 (S119). The paper pusher 50 then drives the stack of documents 150 in a lateral direction not the first roller 370a (S120). The control circuit 1500 determines whether the stack of documents 150 are in contact with the first roller 370a (S121). If no, then the control process repeats S120). If yes, then the paper pusher 50 is returned to its original position (S122). Next, the first roller 370a drives the stack of documents 150 to the scanner entrance 380 (S123) and the second roller 370b drives the folder to another location (S124) where the processed documents will be replaced (S125) and the process stops (S126).

In addition, as described below, the inventor has created a method and apparatus for filing documents in folders. One of ordinary skill in the art would recognize that the features described below can be combined in whole or part with the features described in FIGS. 1-7.

In one embodiment, a folder to hold documents is moved into position by two rollers. The first roller will move the folder across a folder lifter. Subsequently, two other rollers will guide the file folder into the ready state for receiving a sheaf of papers. Once in the ready state, one of the subsequent rollers will retract and the folder lifter will rise such that the folder is opened. Then a paper pushing assembly including a paper tray, loaded with a sheaf of papers, and a paper pusher will move into place and the paper pusher will push the sheaf of papers into the file folder. The file folder is then loaded onto a conveyor and moved to the next stage of processing.

In certain embodiments, the folder may have held the same sheaf of papers earlier in processing and so the sheaf of papers is being returned to the original file folder.

The system can be internally contained within an MFS, or can be a separate unit in a printing system. For example, the system could be connected to an MFS and could process papers that have been previously processed by the MFS.

Figure 9:
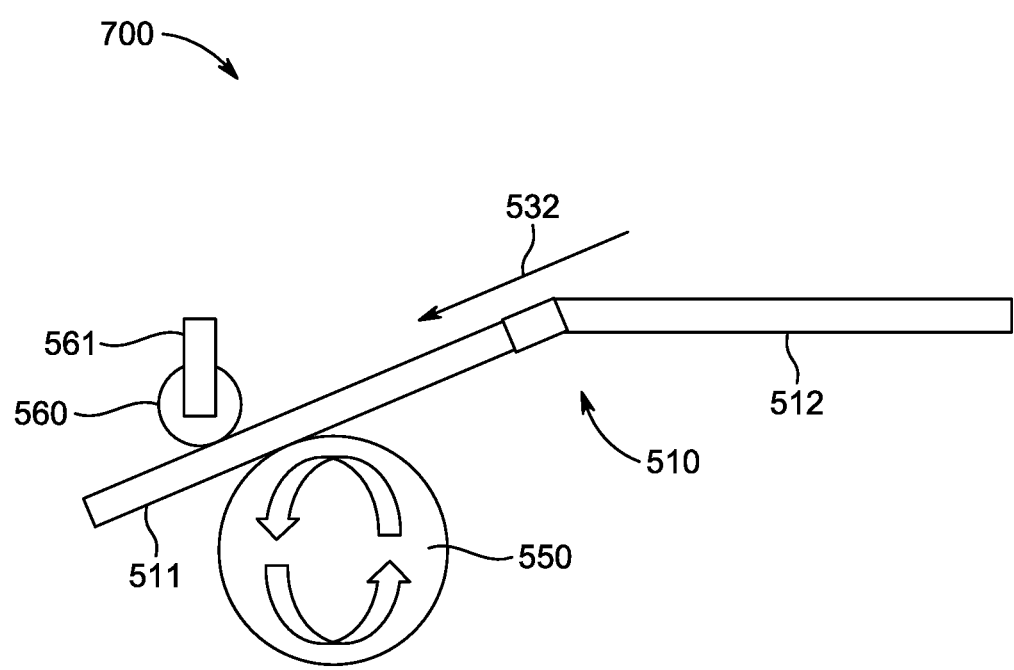
FIG. 9 shows a side view of the apparatus for opening a file folder for receiving a sheaf of papers in one embodiment of the disclosure.

FIG. 9 shows the side view of the system 700 for opening file folder 510 for receiving sheaf of papers 530 in one embodiment of the disclosure.

Figure 8:
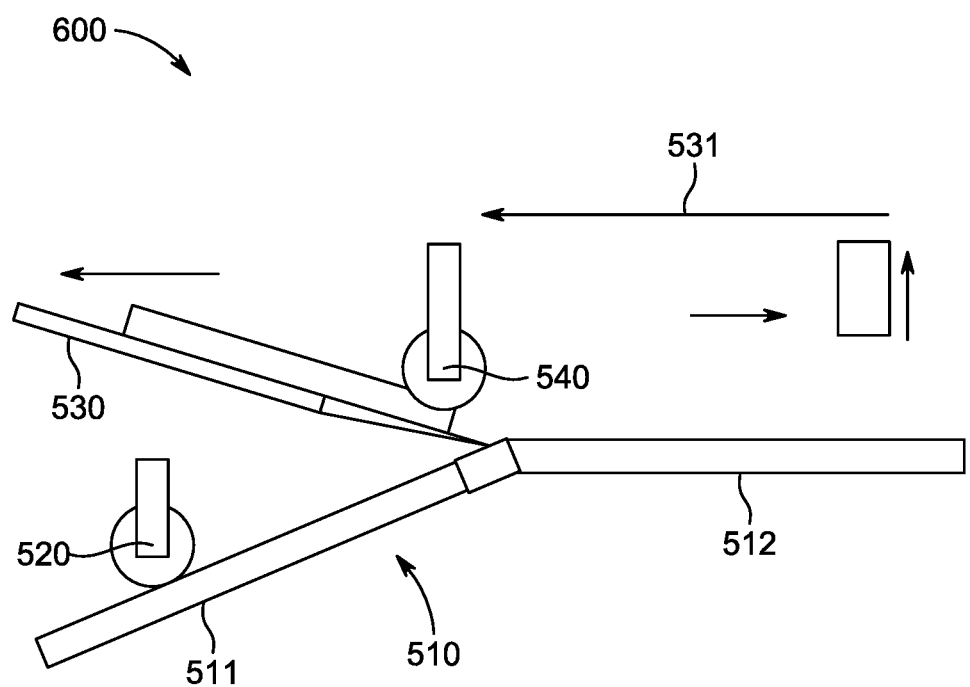
FIG. 8 shows a side view of a sheaf of papers removal, or de-foldering, process according to related art.

This may occur after sheaf of papers 530 has been scanned or otherwise processed, as discussed in FIG. 8 for example. Depending on system specifications, sheaf of papers 530 may have been removed for scanning from the same file folder 510. Alternatively, sheaf of papers 530 may have been removed from a separate file folder prior to scanning or other processing by MFS. In another embodiment, sheaf of papers 530 has been created (e.g. via printing or facsimile request) and is being placed in file folder 510 from a file folder storage (not shown).

File folder 510 could include any file folder compatible with and capable of being processed by an MFS. For example, file folder 510 could be made of paper stock, plastic, or other material. Similarly, file folder 510 could include tabs of any size, including for example $\frac{1}{3}^{rd}$ cut or $\frac{1}{5}^{th}$ cut. An exemplary file folder could be a commonly known manila folder.

Paper sheaf 530 could include any paper compatible with and capable of being processed by an MFS. For example, paper sheaf 530 could be comprised of one or more sheets of 8.5×11 inch 20-pound bond weight paper. Similarly, paper sheaf 530 could be comprised of sheets of different sized paper, i.e. 8.5×14 inch, or different weights, i.e. 36-pound bound paper. Paper sheaf 30 could also include an ISO 216 size paper, or any other suitable size or weight of paper.

From the side view of system 700 shown in FIG. 9, it can be seen that after file folder 510 is loaded into position, either by human intervention or by mechanical means such as a conveyor belt, a movable tray or the like (not shown), roller 550 and roller 560 process file folder 510 in the direction of file folder feed 532. This process can be initiated, for example, after the de-foldering process referred to above in FIG. 8.

Figure 20:
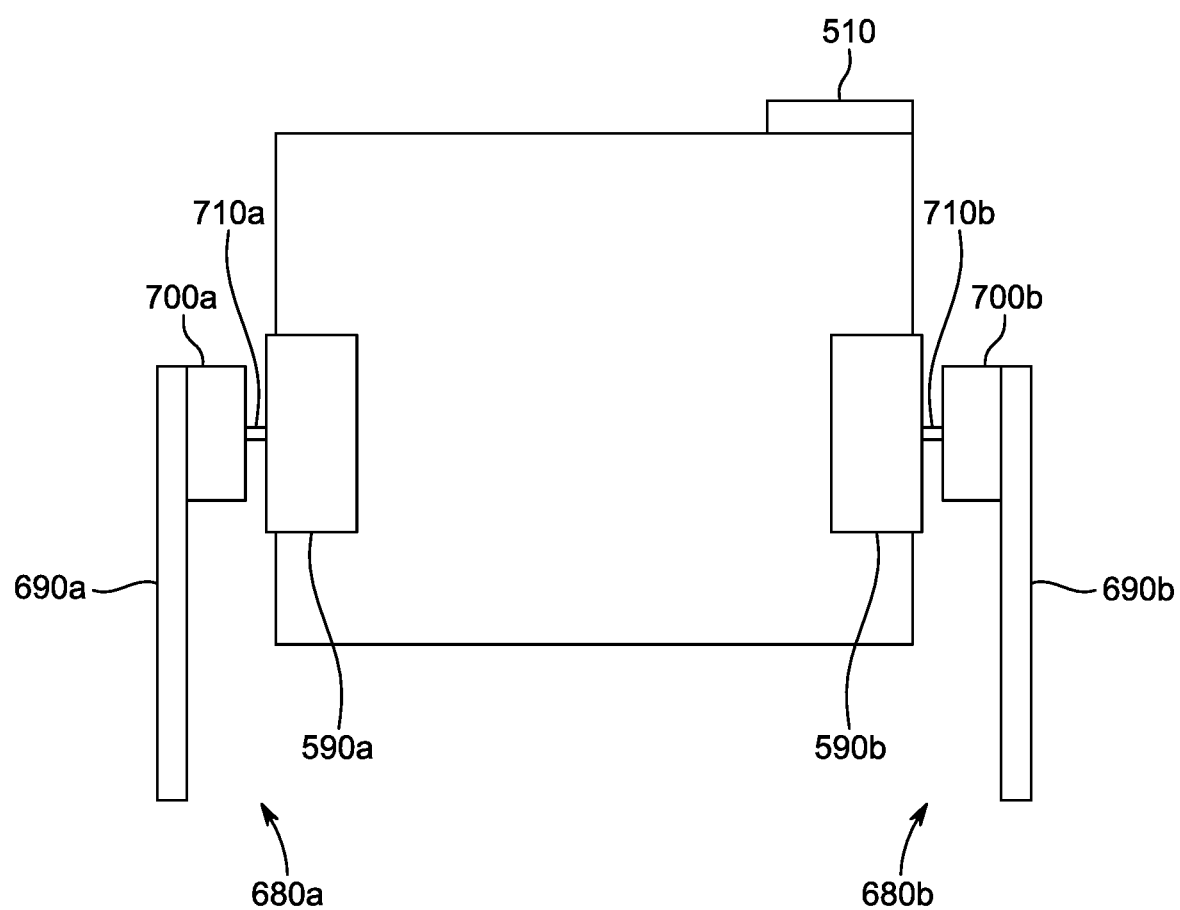
FIG. 20 shows a plan view with rollers positioned inside the file folder of the apparatus for opening a file folder for receiving a sheaf of papers in one embodiment of the disclosure.
Figure 21:
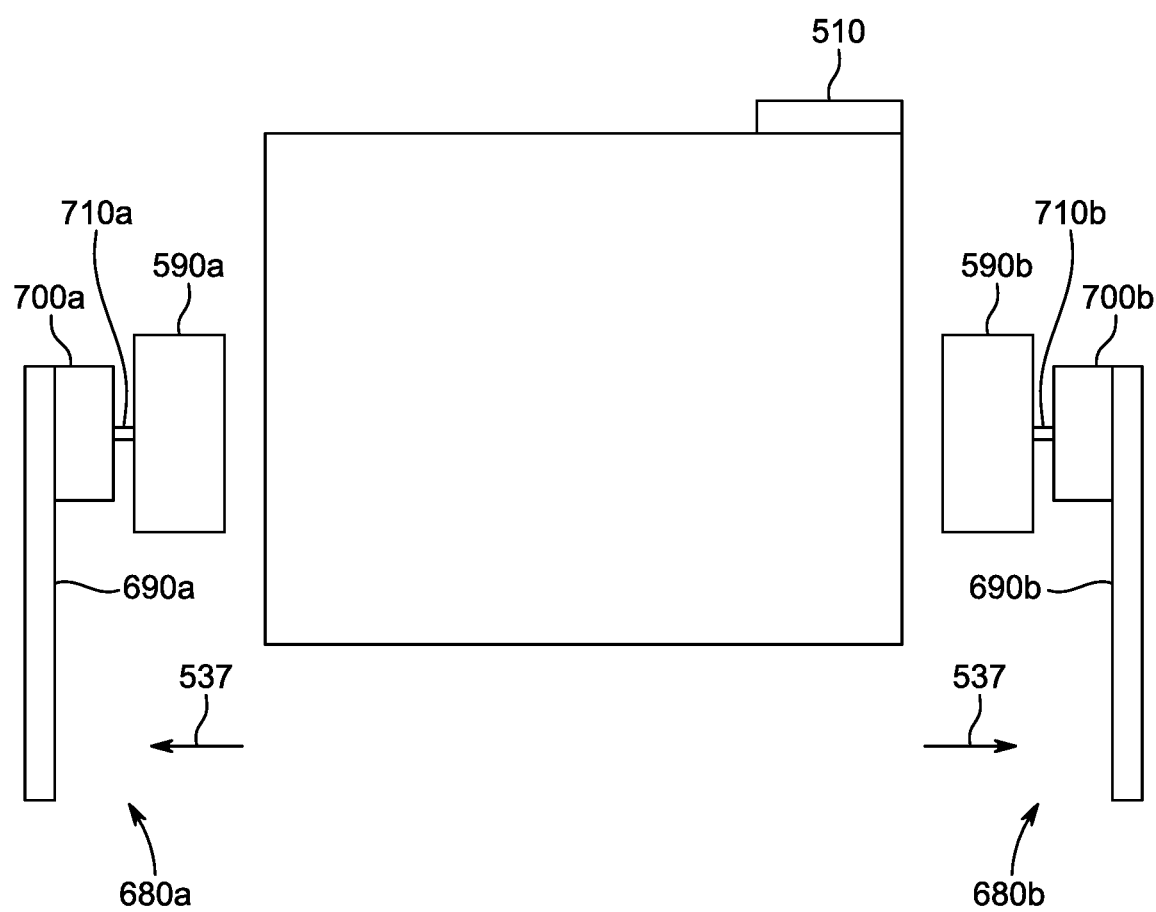
FIG. 21 shows a plan view with rollers positioned outside of the file folder of the apparatus for opening a file folder for receiving a sheaf of papers in one embodiment of the disclosure.

Roller 560, as depicted, is cylindrical, though depending on system specifications could be other shapes as well, such as circular or oblong. For example, roller 560 may be a single long cylinder which extends over a portion or all of file folder 510. Alternatively, as shown in FIGS. 20-21, roller 560 may be two smaller rollers located on either side of file folder 510. Accordingly, although the description may reference a single roller, such as rollers 550, 560, 580 and 590, it is understood that a single roller could instead be two or more rollers. Additionally, with regard to dimensions, roller 560 may be any dimension necessary to fit the system, so long as it is capable of directing sheaf of papers 530. Roller 560 may be formed of any elastically deformable material, or have such an outer coating in order to effectively grip and move paper. Roller 560 is connected to the system 600 via arm 561, which can be ultimately connected to the MFS frame, or a separate body/frame, which can connect to an MFS. As will be discussed below with regard to an exemplary roller movement assembly 680a, the position of roller 560 is adjusted by arm 561 can be driven by any means, including, for example, an electric motor or solenoid, or other type of movement mechanism. The position of roller 560 and arm 561 can be controlled by a control circuit 1500 as will be discussed below.

If not expressly discussed below, the characteristics of roller 560, including its dimensions, materials, position adjustment, and control means will equally apply to all rollers discussed below. Similarly, although it may not be depicted or discussed with regard to each figure or embodiment, it is envisioned that each roller is attached to an arm, or other similar device, for controlling the position of the roller.

Roller 550 is positioned underneath the outer portion of side 511 of file folder 510, i.e. the portion that does not contact paper sheaf 530, and is designed to be an outside of the file folder. Roller 550 rotates in the direction of file folder feed 532. In FIG. 9, this rotation is depicted as counterclockwise, though the direction may change depending on the system configuration. Roller 560 is positioned on the inner portion of side 511 and is driven in the direction of file folder feed 532 thereby opening file folder 510. Here, opening the file folder 510 refers to the file folder being a single sheet and not being folded over. Rollers 550 and 560 are positioned such that a suitable amount of space exists between the rollers so as to apply a pressure to the file folder 510 sufficient for gripping and moving it. To accomplish this, the roller arms (not shown), holding the rollers, could be spring-loaded so as to apply a proper amount of force on the opposite roller, or the roller arms could be movable by a movement means such as a motor, solenoid, etc.

Figure 10A:
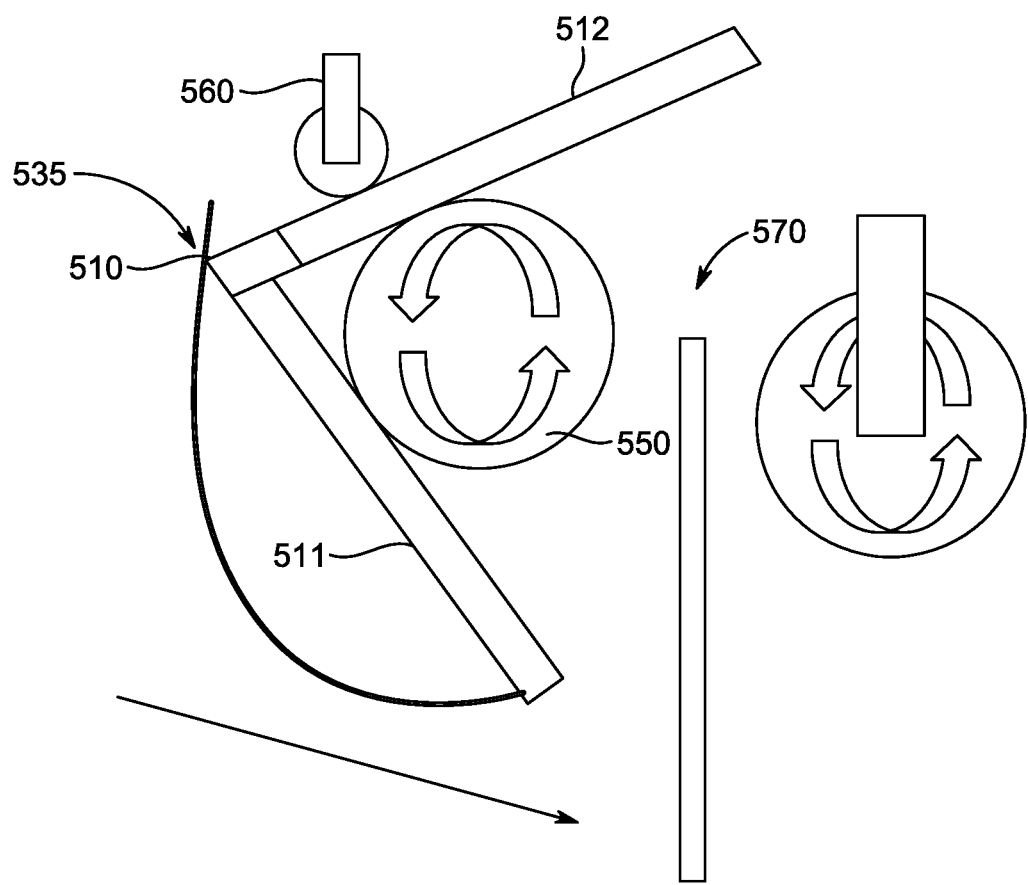
FIG. 10A shows a side view of the apparatus for opening a file folder for receiving a sheaf of papers in one embodiment of the disclosure

FIG. 10A shows the side view of a system for preparing file folder 510 for receiving sheaf of papers 530 in one embodiment. As shown in FIG. 10A, rollers 550 and 560 process file folder 510, causing the file folder 510 to impact the paper guide 535. Paper guide 535 is curved in order to guide the file folder 10 in a downward direction when the file folder 510 strikes it. Further, paper guide 535 is configured so that the file folder 510 is fed around the roller 550 and in some embodiments, the file folder 510 could be pressed against the side/bottom of roller 550. From this perspective it can be seen that roller 550 will rotate and move file folder 510 across/above folder lifter 570, as later shown in FIG. 11.

As will be discussed below, folder lifter 570 may have different structures depending on system requirements, but from the side perspective of FIG. 10A, only one piston assembly 640 (shown in FIG. 18) of folder lifter 570 can be seen. In an embodiment of the disclosure, folder lifter 570 includes a wire 571 attached near the bottom proximal end of piston assembly 650 (shown in FIG. 18) that runs into the page and is attached to another piston assembly 640 (shown in FIG. 18), which is substantially similar and parallel to piston assembly 640 at its other end.

Figure 11:
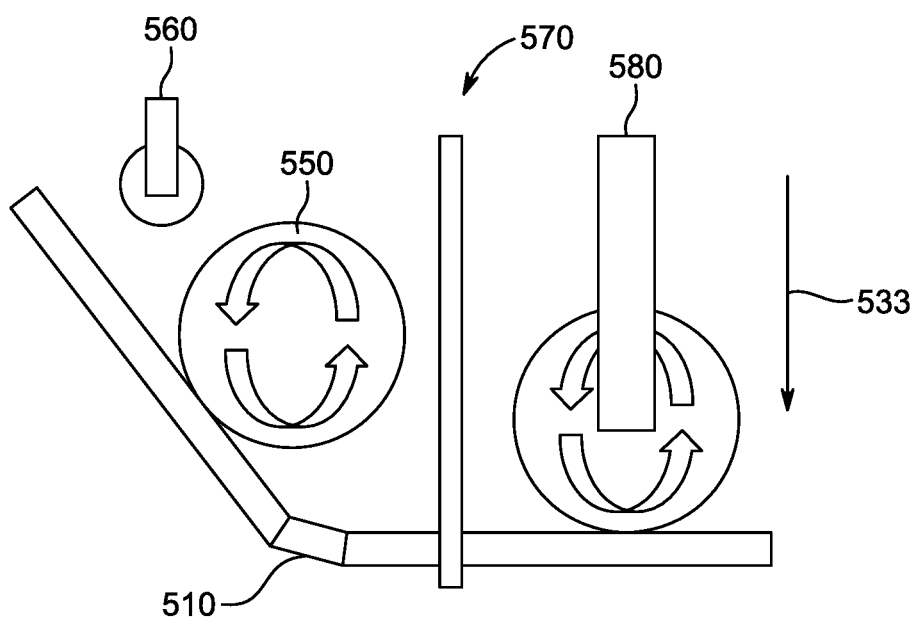
FIG. 11 shows a side view of the apparatus for opening a file folder for receiving a sheaf of papers in one embodiment of the disclosure.

As depicted, roller 550 rotates in a counter-clockwise direction (though the direction may change depending on system requirements) and file folder 510 is moved between rollers 560 and 550 and until it is resting on the wire 571 of folder lifter 570, as indicated in FIG. 11 (although wire 571 doesn't appear in the FIG. 11 view). Specifically, paper guide 535 curves around the outer portion of file folder 510 to guide file folder 510. In this embodiment, as file folder 510 is driven between rollers 560 and 550 by the rotation of roller 550, side 511 of file folder 510 is driven against paper guide 535 and is then propelled along the inner circumference of paper guide 535 toward folder lifter 570. Meanwhile, the hinge portion of file folder 510 bends such that file folder 510 rotates around roller 550.

Paper guide 535 may be made of any substantially non-deformable and rigid material, such as aluminum, steel, plastic, etc. While paper guide 535 is depicted as an arc, it is envisioned that paper guide 535 could be any shape sufficient to guide file folder 510 into position. For example, paper guide 535 could simply be slanted, or parabolic, etc., as long as it is capable of guiding file folder 510 into position.

Figure 10B:
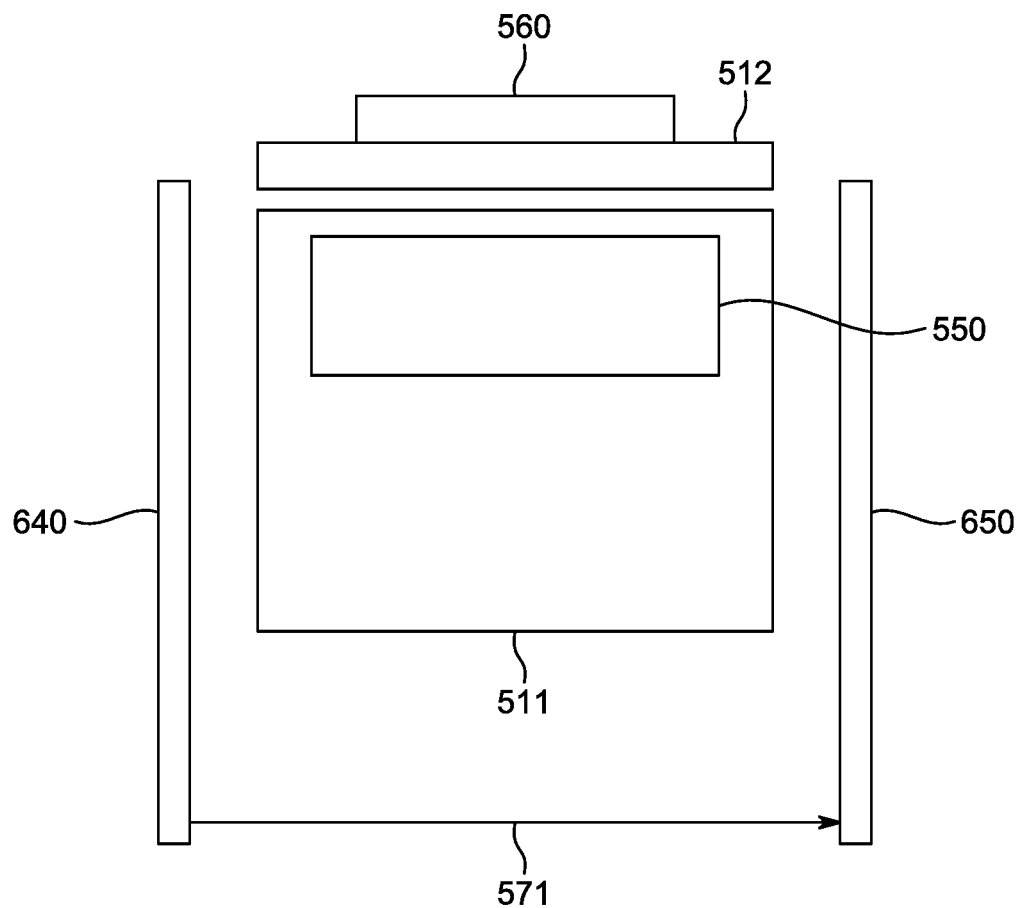
FIG. 10B shows a front view of the apparatus for opening a file folder for receiving a sheaf of papers in one embodiment of the disclosure.

FIG. 10B is a front view of the system 800 shown in FIG. 10A. From this perspective, the alignment of paper guide 535, file folder 510, roller 550, and the details of folder lifter 570 can be seen.

Figure 12:
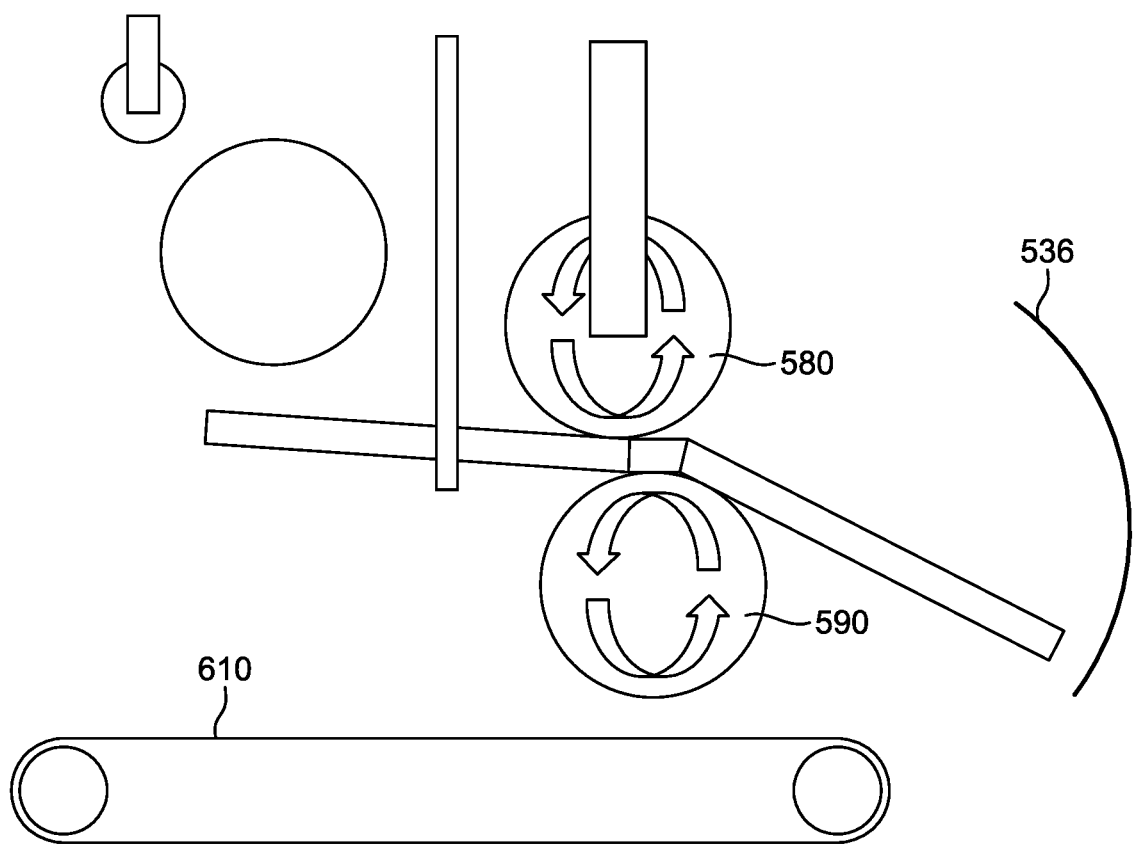
FIG. 12 shows a side view of the apparatus for opening a file folder for receiving a sheaf of papers in one embodiment of the disclosure.

As shown in FIG. 11, rollers 550 and 580 then guide file folder 510 into the next processing step. In this embodiment, roller 580 moves in direction 533, thereby applying a downward force on file folder 510. As shown in FIG. 12, file folder 510 is securely held between roller 580 and roller 590. This additional pressure applied by rollers 580 and 590 allows for improved control and movement of file folder 510. As will be discussed below, the mechanism for moving the rollers can include, for example, a motor(s) and shafts attached to the arms connected to the rollers, and can further include a spring to apply the correct amount of force to the folder and the opposite roller.

Figure 13:
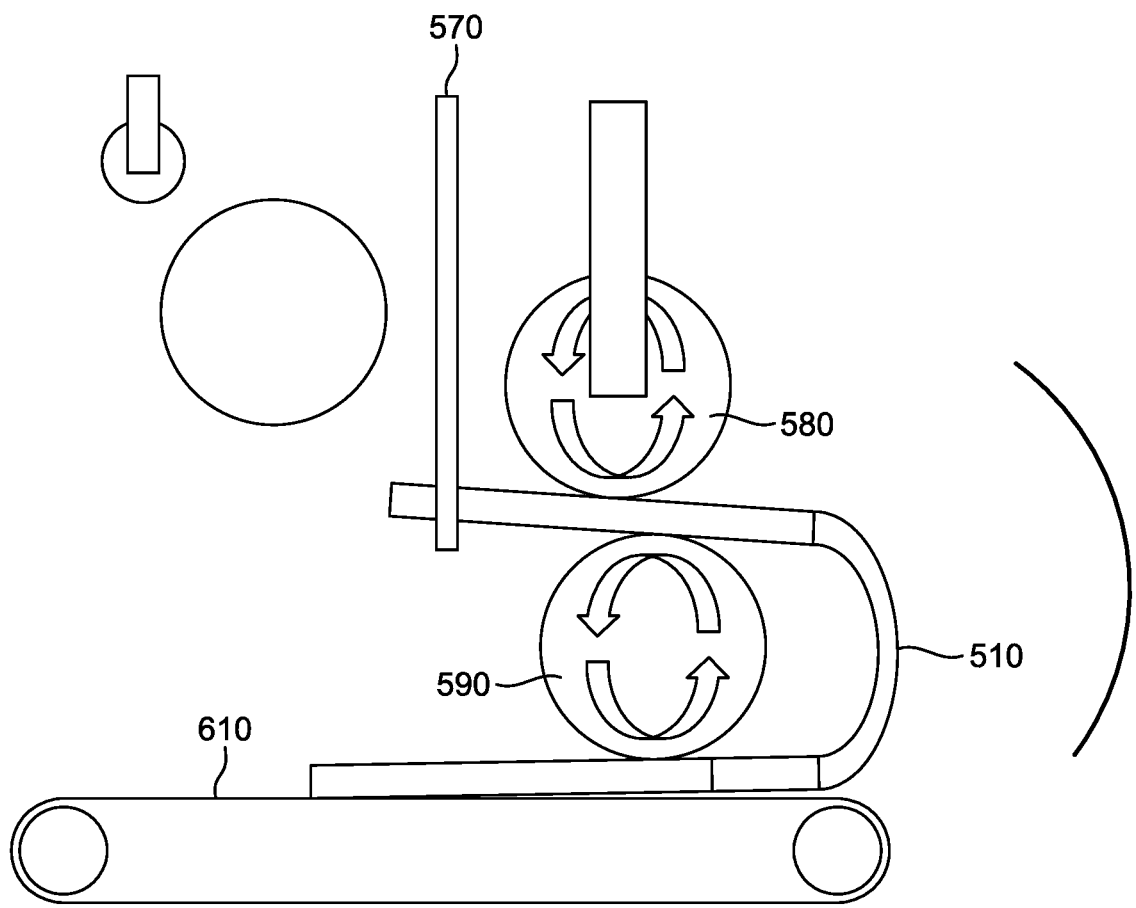
FIG. 13 shows a side view of the apparatus for opening a file folder for receiving a sheaf of papers in one embodiment of the disclosure.

In FIGS. 12 and 13, file folder 510 is positioned in the "Ready State" for receiving a paper sheaf. In the depicted embodiment, roller 580 rotates in a counter-clockwise direction while roller 590 rotates in a clockwise direction. By rotating in these directions, file folder 510 is driven by rollers 580 and 590 against paper guide 536 and around roller 590, and onto conveyor belt 610. In some embodiments, while, or after, file folder 510 has rotated around roller 590, folder lifter 570 will retract upwards thereby opening file folder 510. Folder lifter 570 moves upwards far enough that paper sheaf 530 can be pushed into file folder 510 (discussed below) but not so far that file folder 510 will fall off of folder lifter 570. As discussed below, several mechanisms can be used to position folder lifter 570.

Paper guide 536 is substantially similar to paper guide 535, though it guides file folder from between roller 580 and 590, around roller 590, and onto conveyor belt 610.

Although the above description discloses certain embodiments of the disclosure, it is understood that the file folder may be moved to the Ready State in various ways. For example, the number, orientation, rotational direction, and size of the rollers may be adjusted for system configuration. Similarly, the means of file folder movement may be accomplished without rollers, including, for example, by a clamping assembly driven by an electric motor or solenoid, or other type of movement mechanism (not shown), or the file folder may be placed into the Ready State by direct human interaction.

Figure 14:
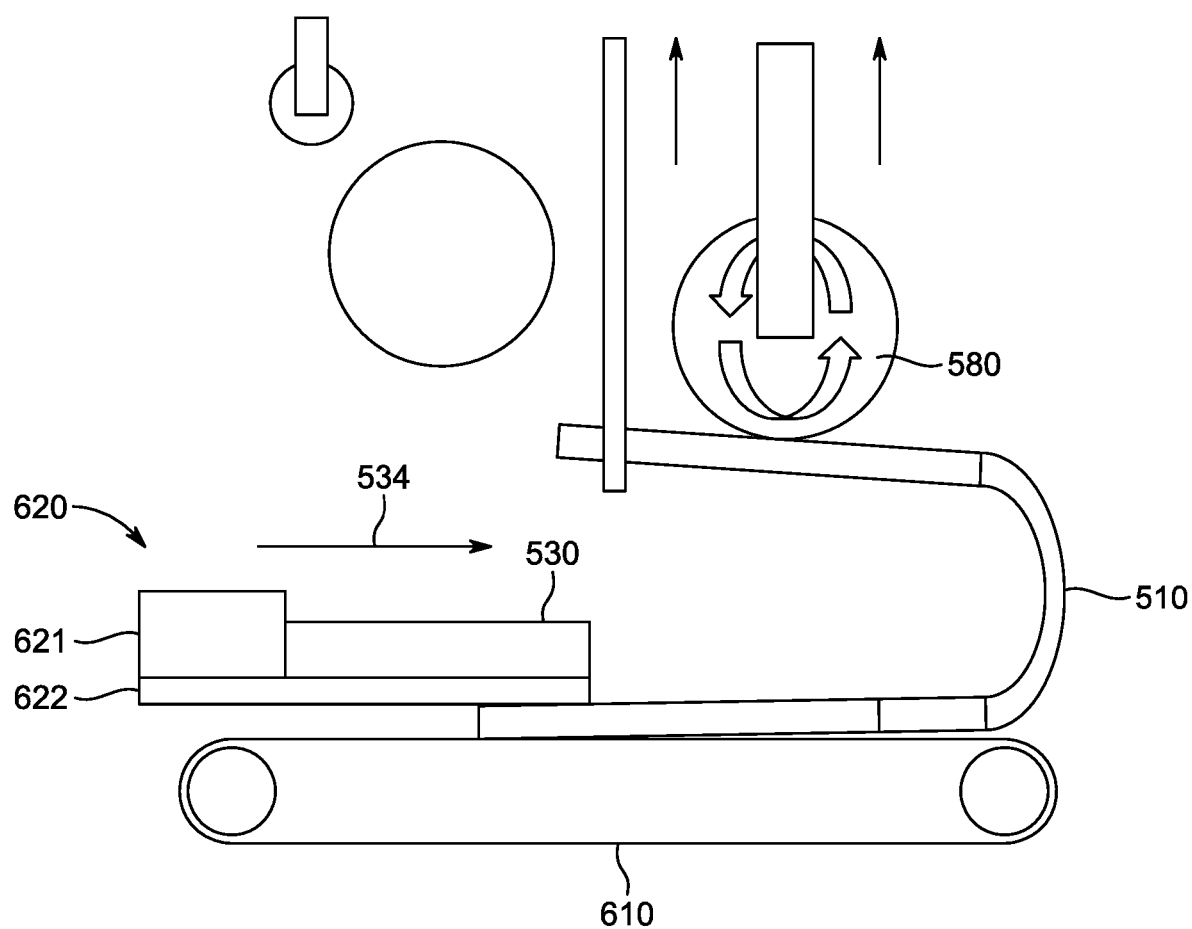
FIG. 14 shows a side view of the apparatus for opening a file folder for receiving a sheaf of papers in one embodiment of the disclosure.
Figure 15:
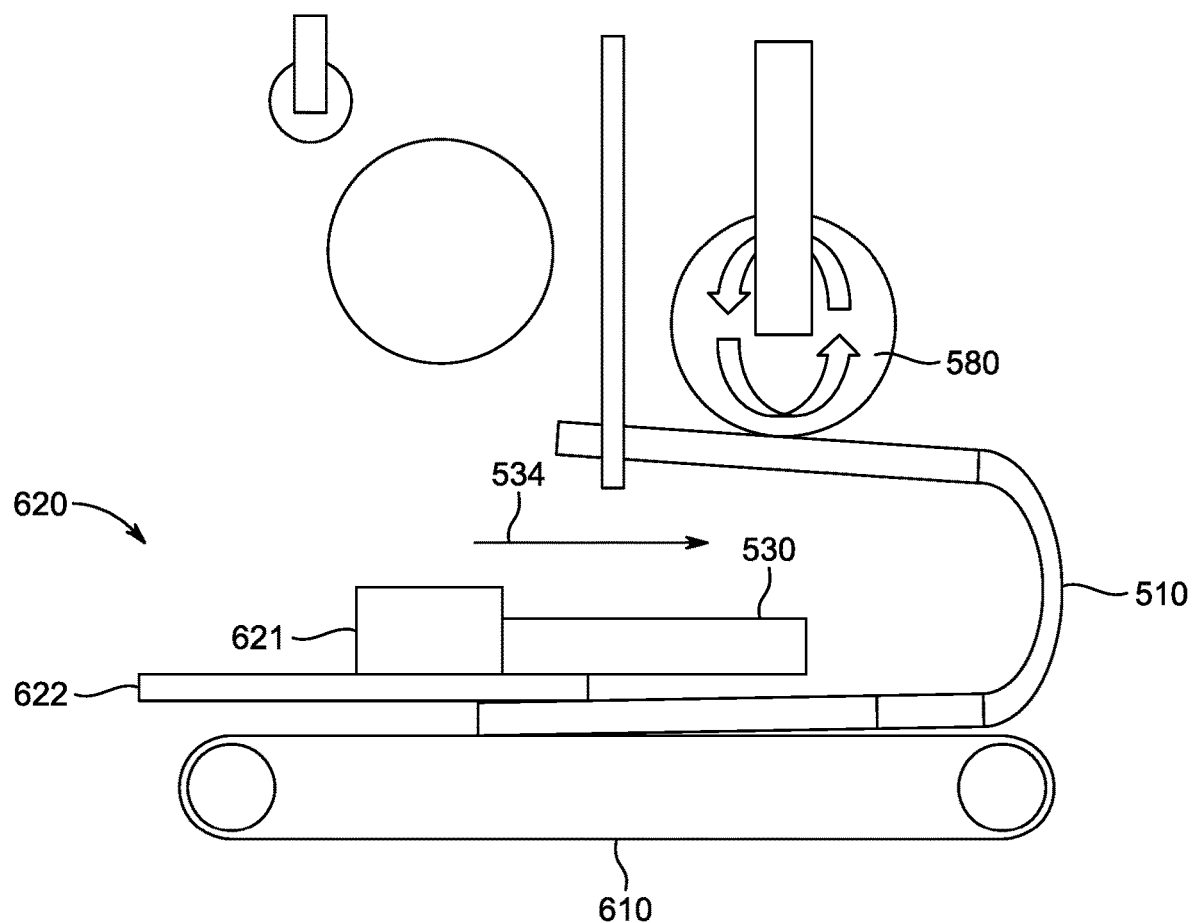
FIG. 15 shows a side view of the apparatus for opening a file folder for receiving a sheaf of papers in one embodiment of the disclosure.
Figure 16:
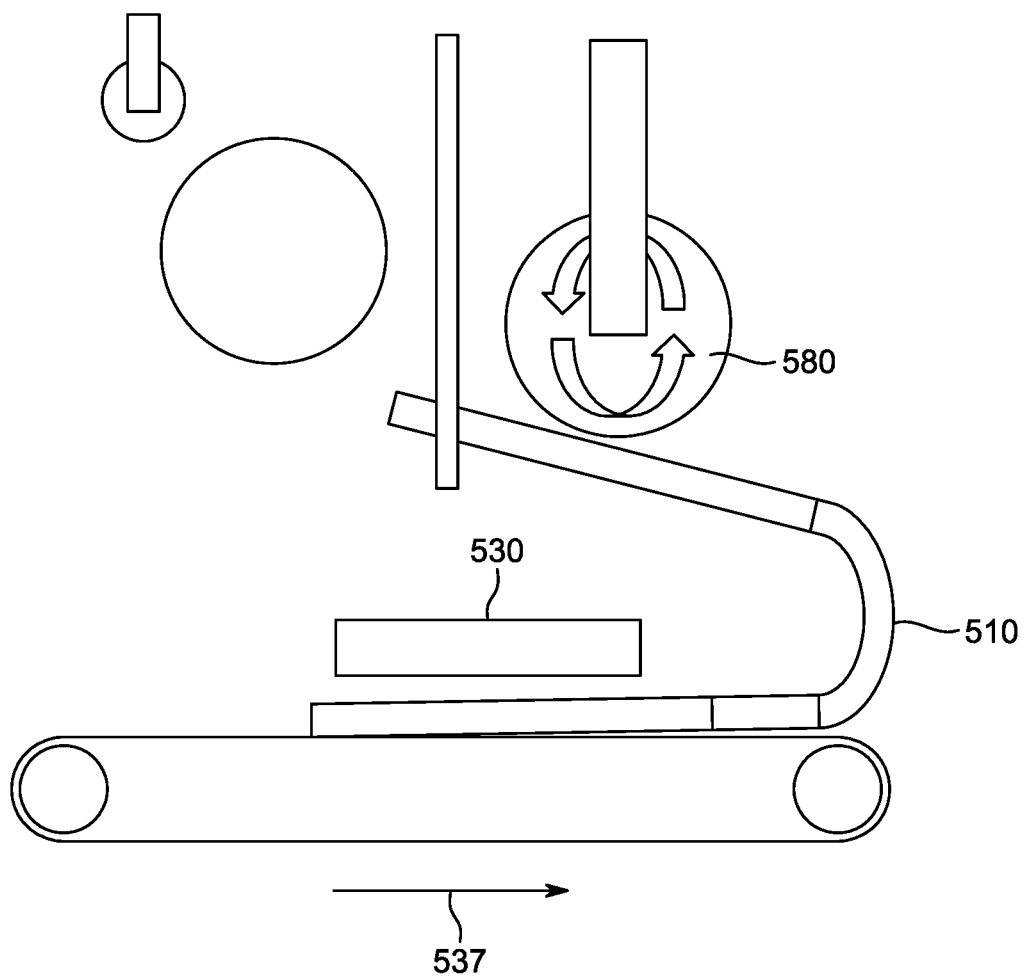
FIG. 16 shows a side view of the apparatus for opening a file folder for receiving a sheaf of papers in one embodiment of the disclosure.

Once in the Ready State, the file folder 510 is ready for paper sheaf 530 insertion. As shown in FIGS. 14-16 for example, paper sheaf 530 may be inserted into file folder 510 by a paper pusher assembly 620.

As depicted in FIG. 14, roller 590 retracts to avoid interference with paper sheaf 530. Roller 590 could retract orthogonally or laterally beyond the furthest edge of file folder 510, for example.

After roller 590 retracts, and as mentioned above, folder lifter 570 can optionally further open the file folder 510, shown in FIG. 16, for example. With the file folder held in the open position by the folder lifter 570, the paper pusher assembly 620 moves into a position for paper sheaf insertion. Paper pusher assembly 620 is capable of pushing paper sheaf 530 in direction 534 into file folder 510. As depicted, paper pusher assembly 620 includes a pushing mechanism 621 and a paper tray 622.

As shown in FIG. 14, the proximal end of paper tray 622 is positioned inside and in between sides 511 and 512 of the file folder 510 so that a pushing mechanism 621 can push the paper sheaf 530 into the file folder without the paper sheaf 530 becoming caught or snagged on an edge of the file folder 510.

As depicted in FIG. 14, paper tray 622 is a rectangular prism and includes a flat upper surface upon which paper sheaf 530 rests and is ultimately pushed into file folder 510, though the structure of paper tray 622 may be as needed by the system, as long as it includes a surface to support paper sheaf 530. Paper tray 622 must be capable of sufficiently supporting and stabilizing paper sheaf 530 throughout the process of folder insertion and therefore is preferably made from a rigid material such as aluminum, steel, plastic, etc.

As mentioned above, sheaf of papers 530 may have been scanned or otherwise processed and then placed either by mechanical means or human intervention onto paper tray 622. Depending on system specifications, sheaf of papers 530 may have been removed for scanning from the same file folder 510. Alternatively, sheaf of papers 530 may have been removed from a separate file folder prior to scanning or other processing by MFS. In another embodiment, sheaf of papers 530 has been created (e.g. via printing or facsimile request).

Pushing mechanism 621 includes means for pushing paper sheaf 530 in pushing direction 534 into file folder 510. For example, pushing mechanism 621 could include a piston assembly (not shown) wherein a piston is extended from a housing and pushes paper sheaf 530 along paper tray 622 into file folder. The piston could be driven by various means including, for example, by a solenoid or pneumatic cylinder, depending on system speed, space, cost, or other constraints. The specific pushing mechanism, however, could be driven electrically, pneumatically, or driven by other means as needed to satisfy system design requirements.

Paper pushing assembly 620 may also include different configurations and components as needed for the system. For example, paper pushing assembly 620 may be a conveyor belt which drives and/or drops paper sheaf 530 into file folder 510.

Once paper sheaf 530 has been inserted into file folder 510, paper pusher assembly 620 retracts to its original position, returning to obtain the next paper sheaf, or otherwise retracts to avoid interfering with the next stages of processing.

Figure 17:
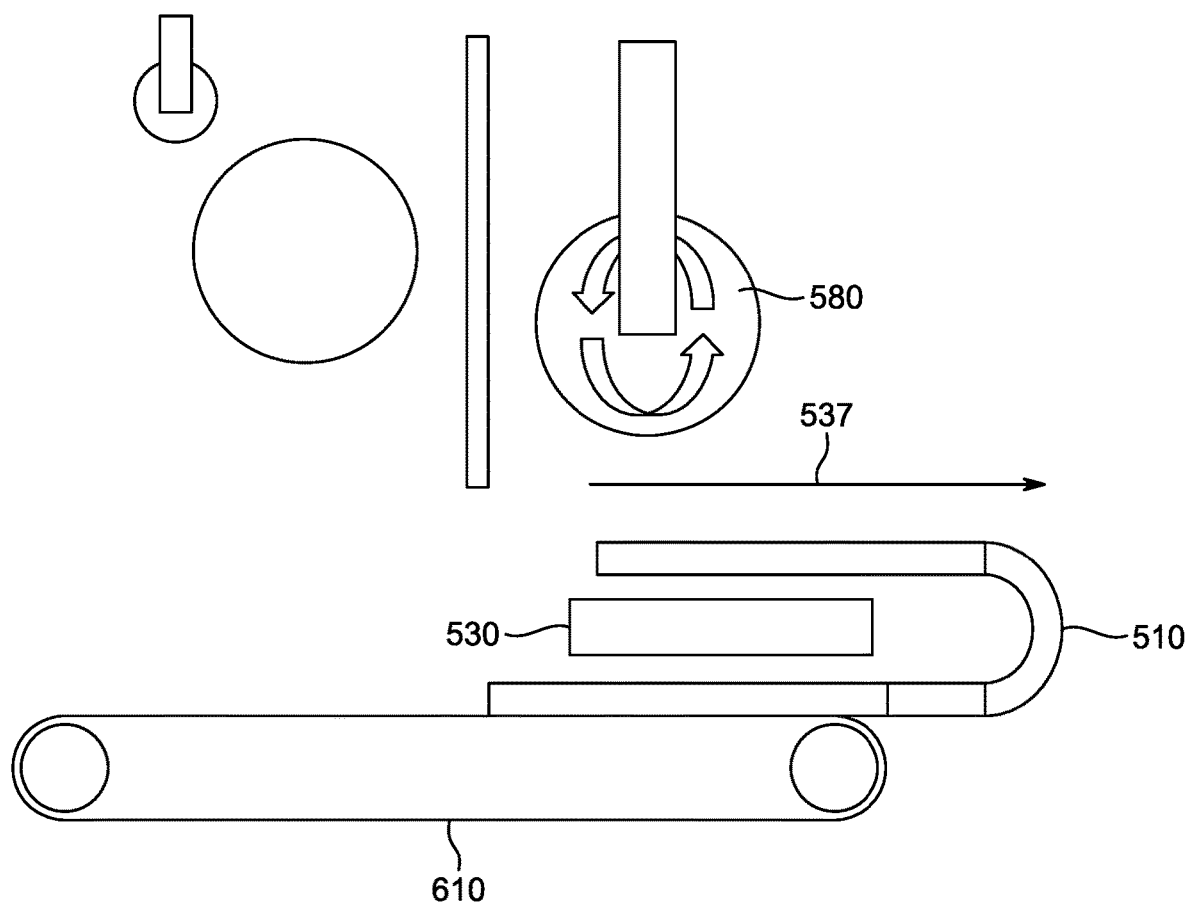
FIG. 17 shows a side view of the apparatus for opening a file folder for receiving a sheaf of papers in one embodiment of the disclosure.

Subsequently, as shown in FIG. 17, conveyor belt 610 then moves file folder 510 in direction 537 to the next stage of processing which could include, for example, a process to store file folder 510 in a binder (not shown) or clip file folder 510 with other documents and/or file folders with a binder clip (not shown). This could be accomplished by driving the conveyor belt 610 in the desired direction. By moving in direction 537, filer folder 510 will be pulled off of folder lifter 570 thereby closing file folder 510 through its own weight. However, the folder lifter 570 may be extended toward conveyor belt 610 to close file folder 510 before the next stage of processing.

Additionally, in other embodiments, it is envisioned that file folder is then ejected from the MFS, or alternatively, positioned for ejection from the MFS.

While the above embodiments employ folder lifter 570 to open file folder 510 to receive paper sheaf 530, the file folder 510 could be opened by other means. Further, in some embodiments, paper could be inserted into file folder 510 without opening file folder 510 with a folder lifter 570. For example, paper pushing assembly 620 could include an edge (not show) at the front of the assembly to slide between the sides of file folder 510 to allow for paper sheaf insertion. Alternatively, a separate opening mechanism (not shown) including a means for grabbing the side of file folder 510 could be employed to lift the side of file folder and open it to allow the paper sheaf 530 to be inserted.

Folder Lifter

Figure 18:
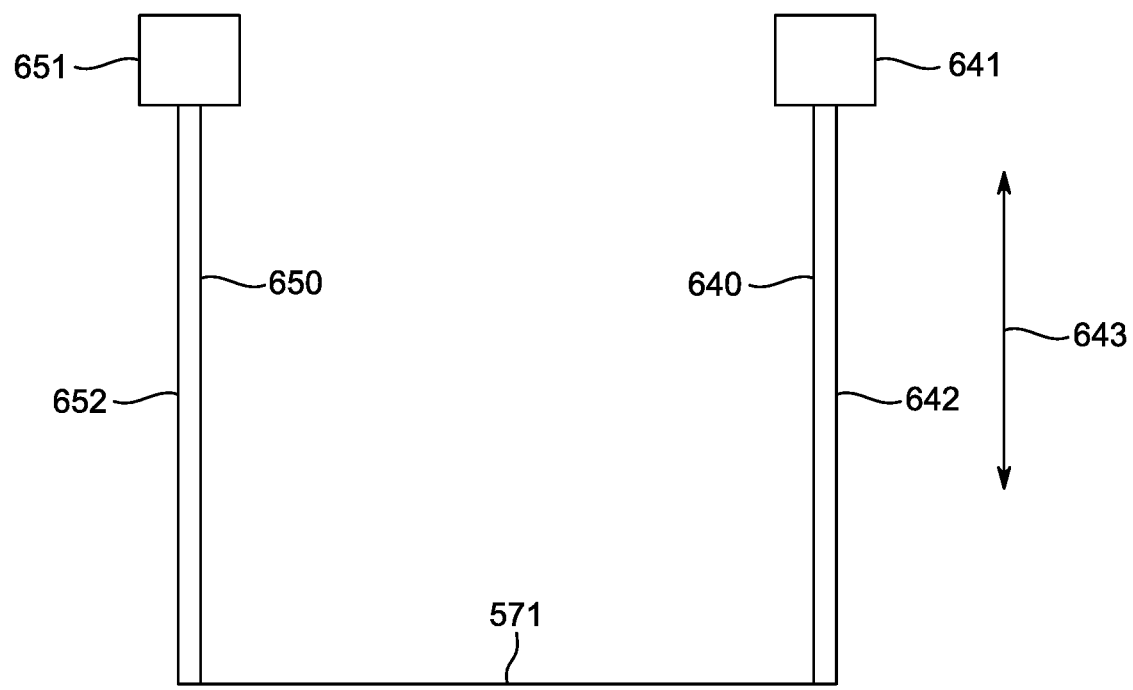
FIG. 18 shows a front view of a piston assembly according to a first embodiment of the disclosure.

FIG. 18 shows a side view of an exemplary folder lifter 570 according to one embodiment of the disclosure. As depicted, folder lifter 570 includes a wire 571 attached to the proximal ends thereof, and piston assemblies 640 and 650.

As depicted, piston assemblies 640 and 650 include piston housing mechanisms 641 and 651 as well as pistons 642 and 652. In this embodiment, pistons 642 and 652 are extended from piston housing mechanisms 641 and 651, moving in an up/down direction 643. Pistons 642 and 652 could be driven by various means including, for example, a solenoid or pneumatic cylinder, depending on system speed, space, cost, or other constraints. The specific pushing mechanism, however, could be driven electrically, pneumatically, or driven by other means as needed to satisfy system design requirements.

The piston assemblies 640 and 650 are configured to be driven at the same time and at the same rate so that the folder being lifted is lifted in an even and smooth manner.

Wire 571 may be comprised of any material capable of being suspended between piston assemblies 640 and 650 and supporting the weight of file folder 510 without substantially deforming in shape. Accordingly, wire 571 is preferably made from a relatively inelastic material such as aluminum, steel, plastic, or the like. The length of wire 571, which is also the same as the distance between pistons 640 and 650 must be at least wider than the width of the file folder being processed.

In other embodiments, folder lifter 570 could be comprised of different components and the components could be in different orientations. For example, folder lifter 570 could include only one piston assembly that is rigidly attached to a cross bar rather than a suspended wire.

Alternatively, folder lifter 570 could be positioned by a movement means including, for example, an electric motor, solenoid, or other type of movement mechanism (not shown).

Figure 19:
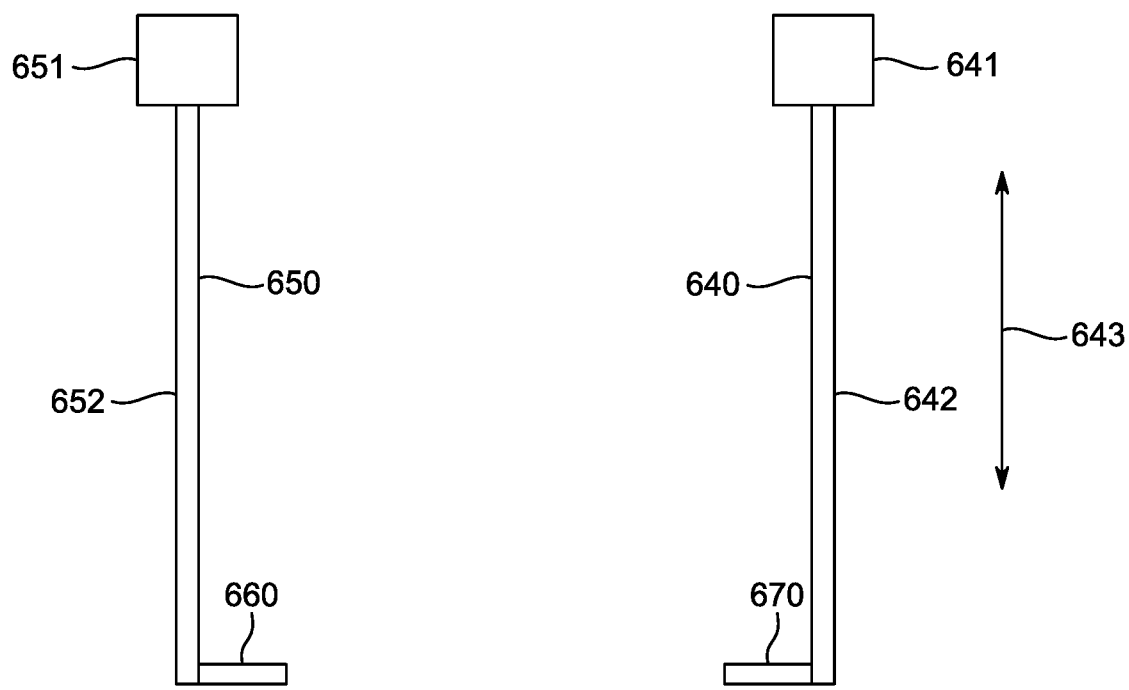
FIG. 19 shows a front view of a piston assembly according to a second embodiment of the disclosure.

FIG. 19 shows a side view of an exemplary folder lifter 570 according to another embodiment of the disclosure. In this embodiment, rather than using wire 571 to support file folder 510 as it is moved, paddles 660 and 670 are rigidly or movably attached to the proximal ends of pistons 642 and 652. These paddles 660 and 670 form a support structure and can be used in place of a wire 571 support structure. With this configuration, the middle portion of file folder 510 will rest on paddles 660 and 670, rather than wire 571, as folder lifter 570 positions file folder 510.

While the paddles 660 and 670 are depicted as rectangular prisms extending toward each other from pistons 642 and 652, the dimensions, including orientation, shape, and size of paddles 660 and 670 may be designed as needed to satisfy design requirements.

Additionally, paddles 660 and 670 may be made from any material sufficient to support file folder 510. Preferably, paddles 660 and 670 are made of a light, inexpensive, and substantially nondeformable material such as aluminum or plastic.

Roller Movement Assembly

FIGS. 20 and 21 show the top view of rollers 590a and 590b retracting after file folder 510 is in the ready state in an exemplary embodiment of the disclosure. FIGS. 20 and 21 depict the retraction of two exemplary motors, though this process could be used for any number of rollers. Accordingly, the below description discloses the retraction of one exemplary roller. As discussed above, it is envisioned that two or more rollers could be used together, rather than a single roller. Similarly, it is also envisioned that the entire roller arm, rather than just the roller, could retract using similar methods. In such an embodiment, a motor and shaft could be located on the opposite side of the arm, with the motor connected to the MFS frame and the shaft connected to the arm.

From this perspective, exemplary roller movement assembly 580a for roller 590a in one embodiment of the disclosure can be seen. Roller movement assembly 680a includes an arm 690a, motor 700a, and shaft 710a. Shaft 710a is connected to motor 700a as well as roller 590a. Accordingly, motor 700a is capable of moving shaft 710a, and attached roller 590a, in forward and reverse direction 537, depending on whether roller 590a is being retracted or extended.

Motor 700a can be an AC or DC motor and can be a servo motor, stepper motor, linear motor, or the like. Alternatively, motor 700a could be any type of movement means necessary to satisfy design requirements including cost, space, speed, and reliability.

Arm 690a can be comprised of any material and be in any form necessary to support roller movement assembly 680a. Accordingly, shaft 710a is preferably a substantially nondeformable material such as aluminum or plastic.

Similarly, shaft 710a may be any material capable of being driven by motor 700a and moving roller 590a.

Accordingly, shaft 710*a* is preferably a substantially non-deformable material such as aluminum, steel, plastic or the like.

As shown in FIG. 21, once motor 700*a* retracts roller 590*a* in direction 537, roller 590*a* is positioned outside of the perimeter of file folder 510 such that file folder 510 can move in a direction orthogonal to direction 537, without interference from roller 590*a*.

Figure 22:
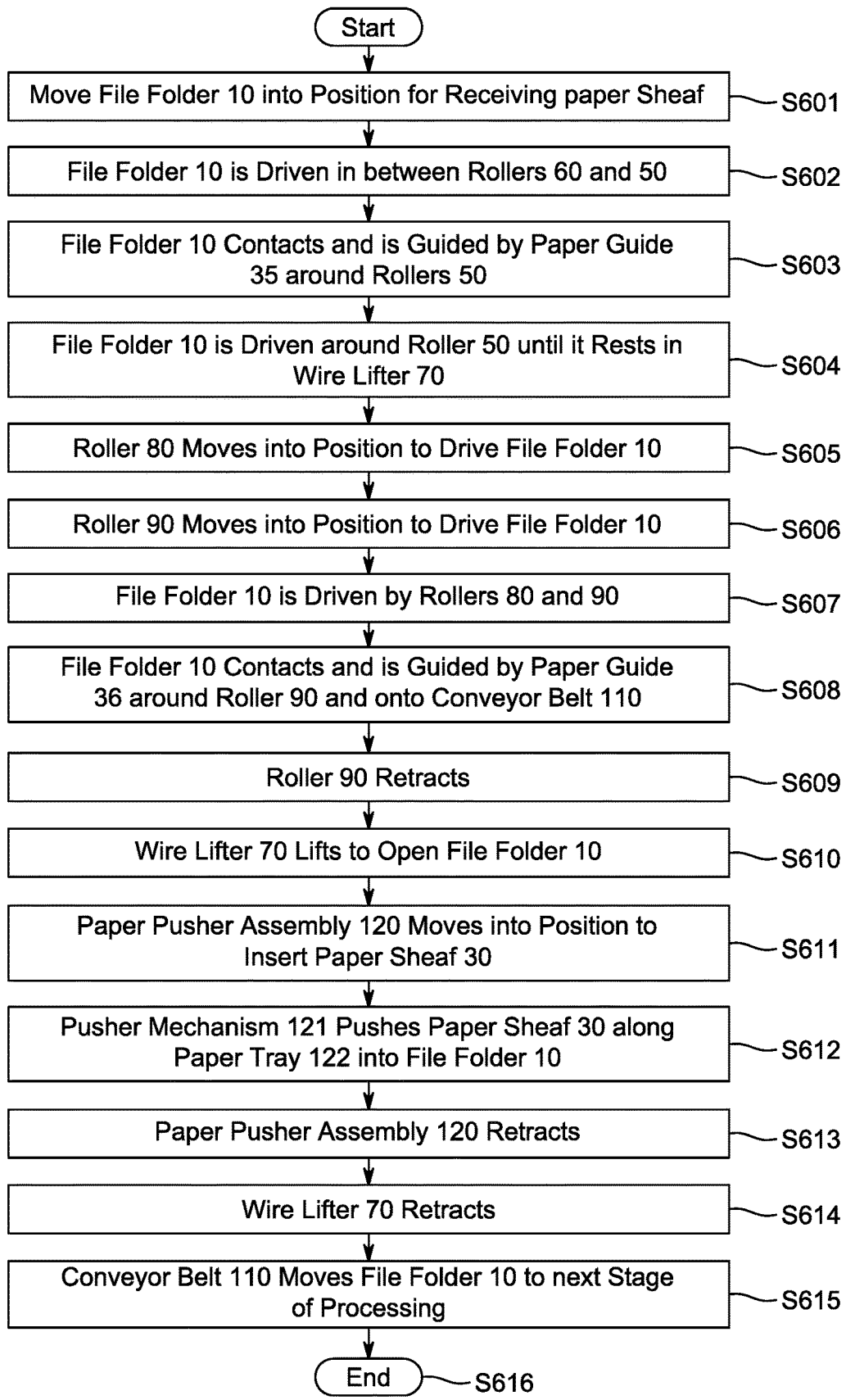
FIG. 22 shows a flowchart of a method for opening a file folder for receiving a sheaf of papers in one embodiment of the disclosure.

FIG. 22 is a flow chart of a foldering process according to one embodiment of the disclosure. The process starts at step 600 and in step 601, file folder 510 is moved into a starting position for processing by the MFS or foldering system. This is an optional step, and may have been performed prior to initiation the disclosed method.

Steps 602 through 609 describe an exemplary method of positioning and preparing a file folder to be ready to receive a paper according to one embodiment of the disclosure. As discussed above with regard to FIGS. 9-13, this could be performed in a variety of methods. For example, the number, size, orientation, and application of rollers and paper guides can be adjusted to accommodate system design requirements, including cost, space, size, and speed.

In step 602, file folder 510 is driven by the rotation of roller 550 in between roller 550 and 560. In step 603, file folder 510 contacts paper guide 535 and is thereby guided by paper guide 535 around roller 550, which is still driving file folder 510.

In step 604, file folder 510 is further driven by roller 550 and guided by paper guide 535 until it rests on folder lifter 570.

In steps 605 and 606, rollers 580 and 590 move into position to further drive file folder 510 into position for receiving paper sheaf 530. The order of these steps may change depending on system specifications. Similarly, these steps may be optional as the position of the rollers may not need to change depending on system specifications.

In step 605, roller 580 moves into position to contact and drive filer folder 510, and in step 606, roller 590 moves into position to drive filer folder 510. Rollers 580 and 590 are configured to apply a force against one another sufficient to hold and move the file folder 510 therebetween.

In step 607, file folder 510 is driven by the rotation of rollers 580 and 590 toward paper guide 536. In step 608, file folder 510, still driven by the rotation of rollers 580 and 590, contacts paper guide 536, which guides file folder 510 around roller 590 and onto a conveyor belt 610.

In step 609, roller 590 retracts so as to not interfere with paper sheaf 530 being inserted in file folder 510. As with steps 606 and 607, this step may be optional as the position of the rollers may not need to change depending on system specifications.

In step 610, folder lifter 570 rises, lifting one side of file folder 510, thereby opening file folder 510. As discussed with regard to FIG. 17, it is also envisioned that file folder 510 could be opened by other means, or paper sheaf 530 could be inserted without opening file folder 510. Further, in some embodiments, the folder lifter 570 does not raise one side of the file folder 510 and simply remains stationary.

In step 611, paper pusher assembly 620, including paper sheaf 530, moves into position for inserting paper sheaf 530 into file folder 510. In step 612, pusher mechanism 621 of paper pusher assembly 620 pushes paper sheaf 530 along paper tray 622 into file folder 510. Next, in step 613, paper pusher assembly 620 retracts.

In step 614, folder lifter 570 retracts. As discussed with regards to FIG. 17, conveyor belt 610 could move file folder 510 away from folder lifter 570 such that the side of file folder 510 resting on folder lifter 570 is pulled off of folder lifter 570 and falls down such that file folder 510 is closed.

In step 615, conveyor belt 610 drives file folder 510 to the next stage of processing.

Figure 23:
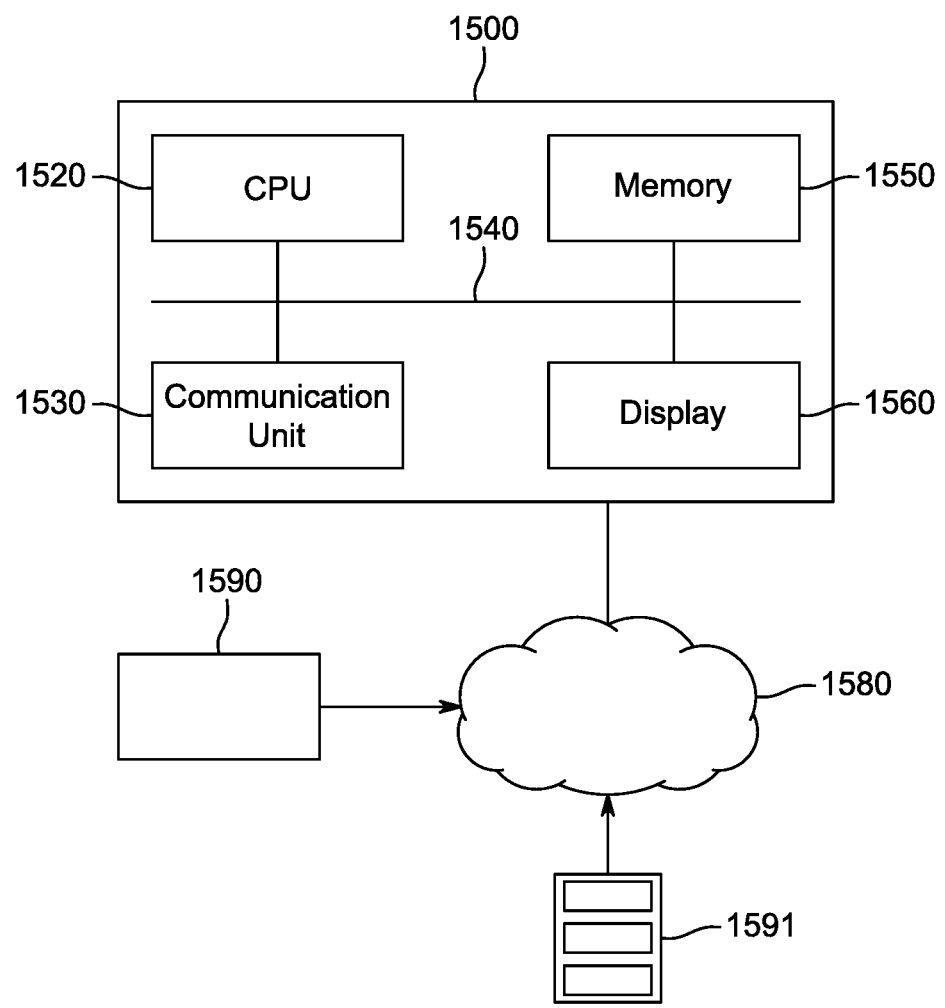
FIG. 23 is a diagram of example components of the control circuit 1500 which may be used to implement one or more aspects of the lifting mechanism 30.

FIG. 23 illustrates an example of a control circuit 1500 that can be used in a scanner and used to control the paperclip attachment system 10, according to an embodiment of the present disclosure. The control circuit can be implemented on a computer, or scanner. The control circuit 1500 can control the scanner and elements of the paperclip attachment system 10, including the push-up bar 40, push-down bar 20, conveyor belt 50, paperclip clamping assembly 70, and paperclip dispensing system 60.

The control circuit 1500 may optionally be networked to another computing system 1590 via a network 1580, such as the Internet or a local area network (LAN) although network 1580 and computing system 1590 need not be part of the control circuit 1500. The control circuit 1500 can include a CPU 1520, memory 1550, communications unit 1530, display 1560, all connected via a bus 1540. It is noted that one or more control circuits 1500 can be used to implement various aspects of certain embodiments of the disclosure.

The control circuit 1500 can be implemented by one or more scanner's, or various forms of digital computers, such as laptops, desktops, workstations, servers, blade servers, mainframes, and other appropriate computers. The components shown here, their connections and relationships, and their functions, are meant to be examples only, and are not meant to limit embodiments of the disclosure described and/or claimed in this document.

Each of the components of the control circuit 1500 are interconnected using various busses and may be mounted on a common circuit board or in other manners as appropriate. The central processing unit 1520 can process instructions for execution within the control circuit, including instructions stored in the memory or on the storage device to display graphical information on a display. In other embodiments, multiple processors and/or multiple buses may be used, as appropriate, along with multiple memories and types of memory. Also, multiple control circuits may be interconnected.

The central processing unit 1520 may be implemented as an integrated circuit that includes separate and/or multiple analog and digital processors. Additionally, the CPU may be implemented using any of several architectures. For example, the processor may be an x86 processor, RISC (reduced instruction set computers) processor. The processor may coordinate with the other components of the device, such as control of user interfaces, applications run by the device, and wireless communication. Multiple processors or processors with multiple cores may also be used. The processor is primarily responsible for performing the functions discussed in this document, however, a GPU may also be used.

The processor may communicate with a user through a control interface and display interface coupled to a display. The display may be, for example, an LED (liquid crystal display) display, or other appropriate display technology. The display interface may comprise suitable circuitry for driving the display to present graphical and other information to a user. The control interface may receive commands from a user and convert them for submission to the processor. In addition, an external interface may be provided in communication with processor to enable near field communication with other devices. An external interface may provide, for example, for wireless and/or wired communication. Multiple interfaces may also be used.

Input to the control circuit 1500 may be done with a personal computer, server, or other computing device 1590.

The CPU 1520 operates according to a program stored in memory 1550. The CPU 1520 controls the communication unit 1530 and the display 1560. The program may be provided through the network 1580 such as the Internet, or provided by being stored in a computer-readable information storage medium such as a DVD-ROM or a USB memory.

The memory 1550 includes, for example, a memory device such as a RAM or a ROM and a hard disk drive. The memory 1550 stores the program. The memory also stores information or computational result input from each unit.

The communication unit 1530 can be a network card which is configured to communicate with other devices, such as a web server or other computers. The communication unit 1530 inputs information received from other devices into the CPU 1520 or the memory 1550 based on the control of the CPU 1520 and sends the information to other devices.

Bus 1540 is configured to send or receive data to/from the CPU 1520, memory 1550, the communication unit 1530, and the display 1560. For example, the CPU 1520 or memory 1550 is connected to the display 1560 through an expansion bus in the bus 1540.

The in-device memory can be composed of a DRAM. The in-device memory is connected to the CPU 1520 and the memory 1550 through the bus 1540. The high-speed memory is composed of, for example, a SRAM that is capable of higher speed access than the in-device memory.

The control circuit 1500, which controls a scanner, can be part of a document processing system. For example, documents which contain paperclips, can be input into the scanner, and once the documents are scanned/digitized and saved to an internal memory 1550 or external memory 1591, paperclips can be attached or re-attached to the documents. Once the documents are stored in memory, the documents could be processed or manipulated in any number of ways.

An example of an external memory 1591 could be another computer/server which is connected to the scanner directly or through a network. Further, the external memory 1591 could be cloud storage, for example. While FIG. 10 shows the external memory 1591 connected to the control circuit 1500 through network 1580, the external memory 1591 could also be directly connected to the control circuit 1500.

The document processing system could intake reams of documents and scan each document and then attach paperclips to the documents without needing a human being to do so. The system could be used to digitize hospital records, for example.

A number of embodiments of the disclosure have been described. It should be understood that various modifications may be made without departing from the spirit and scope of the disclosure. For example, various forms of the flows shown above may be used, with steps re-ordered, added, or removed. Also, although several embodiments of authorizing a remote terminal or mobile device have been described, it should be recognized that numerous other applications are contemplated. Accordingly, other embodiments are within the scope of the following claims.

What is claimed is:

1. A device configured for handling a paper holder comprising an upper cover and a lower cover, the device comprising:
   control circuitry including at least a CPU and associated memory;
   a platform for receiving the paper holder, the platform having detecting means for detecting the presence of the paper holder; and
   a lifting mechanism comprising an adhesive member; wherein
   the lifting mechanism is configured to move in X, Y, and Z directions in response to an instruction from the control circuitry,
   the adhesive member is configured to removably attach to the upper cover of the paper holder,
   the lifting mechanism is configured to flip the upper cover of the paper holder open when the adhesive member is attached to the upper cover, and
   the lifting mechanism is configured to detach from the paper holder and return to its original position away from the paper holder after the upper cover is flipped open.

2. The device according to claim 1, further comprising:
   a plurality of servomotors configured to control movement of the lifting mechanism.

3. The device according to claim 1, further comprising:
   at least one paper sandwiched between the upper cover and the lower cover; and
   a paper pusher positioned above the paper holder and having a height greater than a total thickness of the at least one paper, wherein the paper pusher is configured to
   move in a vertical direction and horizontal direction,
   contact a side surface of the at least one paper, and
   push the at least one paper to a predetermined position on the platform.

4. The device according to claim 3, further comprising:
   a scanner entrance;
   a first roller configured to drive the paper holder forward; and
   a second roller configured to contact a front side of the upper cover and push the paper holder to a separate channel away from the scanner entrance, wherein
   the first roller is further configured to push the at least one paper pushed to the predetermined position by the paper pusher to the scanner entrance.

5. The device according to claim 4, further comprising:
   a plurality of servomotors configured to control movement of the first roller, the second roller, and the paper pusher.

6. The device according to claim 4, wherein
   the scanner entrance extends away from the separate channel,
   the paper holder is processed through the separate channel, and
   the at least one paper is processed through the scanner entrance.

7. The device according to claim 1, wherein
   the lifting mechanism comprises an arm, a plate, and a belt,
   the belt comprises the adhesive member and is driven by at least one servomotor,
   the arm is configured to move to a position such that the belt attaches to a desired position on the upper cover of the folder, and
   the arm is configured to rotate in a half circle pattern to rotate and flip the upper cover of the paper holder open when the adhesive member is attached to the upper cover.

8. The device according to claim 7, wherein
the lifting mechanism further comprises a shaft attached to the plate and driven by a motor to extend and retract from the arm,
an opening is formed in the plate,
the belt is configured to extend through the opening to adhere to the upper cover,
the arm is configured to detach from the paper holder and return to its original position away from the folder after the upper cover is flipped,
the shaft is configured to extend the plate away from the arm to release the belt from the upper cover.

9. The device according to claim 7, further comprising:
an adhesive reservoir arranged in communication with the belt, wherein
the rotating belt is positioned to contact a content of the adhesive reservoir to transfer a portion of the content to the belt.

10. The device according to claim 1, further comprising a stack of papers sandwiched between the upper cover and the lower cover.

11. The device according to claim 1, wherein the platform is a conveyor belt.

12. The device according to claim 1, wherein the control circuitry is the means for determining that an object on the platform is the paper holder.

13. The device according to claim 12, wherein the determination is made by taking an image of the object and comparing the image with an image of a paper holder.

14. A device configured for handling a paper holder comprising an upper cover and a lower cover, the device comprising:
control circuitry including at least a CPU and associated memory;
a platform for receiving the paper holder, the platform having detecting means for detecting the presence of the paper holder;
a lifting mechanism controlled by the control circuitry, the lifting mechanism comprising an adhesive member;
a paper pusher positioned above the paper holder and having a height greater than a total thickness of at least one paper;
a first roller moveable in multiple directions; and
a second roller moveable in multiple directions; wherein
the lifting mechanism is configured to move in X, Y, and Z directions in response to an instruction from the control circuitry,
the adhesive member is configured to removably attach to the upper cover of the paper holder,
the lifting mechanism is configured to flip the upper cover of the paper holder open when the adhesive member is attached to the upper cover,
the lifting mechanism is configured to detach from the paper holder and return to its original position away from the paper holder after the upper cover is flipped open,
the paper pusher is configured to push at least one paper to a predetermined position on the platform,
the first roller is configured to drive the folder forward and to push the at least one paper pushed to the predetermined position by the paper pusher to the scanner entrance, and
the second roller is configured to push the folder to a separate channel away from a scanner entrance channel.

15. The device according to claim 14, wherein:
the means for determining that an object on the platform is the paper holder comprises the control circuitry and an image forming device; and
the determination is made by the control circuitry taking an image of the object with the image forming device and comparing the image with an image of a paper holder.

16. The device according to claim 14, wherein the platform is a conveyor belt.

17. The device according to claim 14, wherein the at least one paper is a stack of papers.

18. The device according to claim 14, wherein the adhesive member is a motor driven belt.

19. The device according to claim 18, further comprising:
an adhesive reservoir arranged in communication with the motor driven belt, wherein
the motor driven belt is positioned to contact a content of the adhesive reservoir to transfer a portion of the content to the motor driven belt.

20. In a device configured for handling a paper holder comprising an upper cover and a lower cover, the device including a platform for receiving the paper holder, the platform having detecting means for detecting the presence of the paper holder, and the device including control circuitry having at least a CPU and associated memory, a method for automatically opening a paper holder and pushing documents contained in the paper holder onto a platform of a device for processing, the method executed by the control circuitry as configured by a program in the memory, and comprising:
detecting with the detecting means the paper holder on the platform;
activating a lifting mechanism;
moving the lifting mechanism from its original position to a position above an upper cover of the paper holder;
attaching the lifting mechanism to the upper cover of the paper holder;
rotating the lifting mechanism to flip open the upper cover of the paper holder;
detaching the lifting mechanism from the upper cover of the paper holder;
moving the lifting mechanism to the original position, the original position being away from the paper holder;
activating a first roller in said device, the first roller drives the paper holder and the documents to a predetermined position;
activating a second roller in said device, the second roller drives the paper holder to a second predetermined position;
lowering the first roller to a position that it contacts a top surface of the documents;
activating the second roller to drive the folder to a third predetermined position;
lowering a paper pusher and then driving the documents in a lateral direction to the first roller with the paper pusher;
activating the first roller to drive the documents to a scanner entrance; and
activating the second roller to drive the paper holder to another location.

* * * * *